US006471873B1

(12) United States Patent
Greenberg et al.

(10) Patent No.: US 6,471,873 B1
(45) Date of Patent: Oct. 29, 2002

(54) ELECTROLYTIC PROCESS AND APPARATUS FOR PURIFYING CONTAMINATED AQUEOUS SOLUTIONS AND METHOD FOR USING SAME TO REMEDIATE SOIL

(76) Inventors: Bernard Greenberg, 553 Third St., Brooklyn, NY (US) 11215; Andrew Sulner, 245 E. 80th St., New York, NY (US) 10021

( * ) Notice: Subject to any disclaimer, the term of this patent is extended or adjusted under 35 U.S.C. 154(b) by 0 days.

(21) Appl. No.: 09/491,623

(22) Filed: Jan. 26, 2000

(51) Int. Cl.$^7$ .................................................. C02F 1/46
(52) U.S. Cl. ..................... 210/748; 210/702; 210/767; 210/903; 210/906
(58) Field of Search ................................ 210/702, 748, 210/767, 903, 906; 204/554, 571, 232, 238

(56) References Cited

U.S. PATENT DOCUMENTS

| | | | |
|---|---|---|---|
| 3,888,751 A | * | 6/1975 | Minegishi |
| 4,011,151 A | * | 3/1977 | Ito et al. |
| 4,098,673 A | * | 7/1978 | Zucker |
| 4,111,768 A | * | 9/1978 | Schmidt |
| 4,123,345 A | * | 10/1978 | Shettel |
| 4,786,386 A | * | 11/1988 | Rumeau et al. |

* cited by examiner

*Primary Examiner*—Betsey Morrison Hoey
(74) *Attorney, Agent, or Firm*—Gottlieb, Rackman & Reisman, P.C.

(57) ABSTRACT

An electrolytic process and apparatus purifies contaminated bulk aqueous solutions and remediates soil. The apparatus is an electrolytic treatment or remediation unit consisting of one or more electrolytic cells having a cathode chamber separated from at least one anode chamber by a separation membrane. The cathode chamber has cathode plates positioned at an angle to the perpendicular or vertical axis of the cell made of valve metals with an irreducible oxide coating. Non-turbulent flow of the solution in an interfacial zone adjacent to the cathode is controlled by the evolution of hydrogen during electrolysis, resulting in a steady state flow of colloidal particles and cations in the cathode-solution interface sufficient to collapse the Gouy-Chapman layer, thereby causing total and irreversible agglomeration of all colloidal particles. A separation membrane separates cathode and anode chambers and allows conductivity driven ionic transfers, and prevents electro-osmotic reflux of the anolyte. A maximum pH difference between the cathode and anode chambers, yielding a cathode chamber maximum pH of 9.8 and an anode chamber minimum pH of 3.2, ensures that the transient pH in the interfacial zone rises to levels in excess of 12.0, thereby enabling the precipitation of phosphates as alkaline earth phosphates and the hydrolysis of urea resulting in the oxidation of ammonia to form an oxidant for dissolved organic materials. The contaminated aqueous solution is subjected to high current density electrolysis, after which it is passed to a holding chamber, a filter chamber, and thereafter to at least one anode chamber.

89 Claims, 8 Drawing Sheets

ELECTROLYTIC PROCESS AND APPARATUS FOR PURIFYING CONTAMINATED AQUEOUS SOLUTIONS AND METHOD FOR USING SAME TO REMEDIATE SOIL

FIELD OF THE INVENTION

This invention relates generally to electrolytic techniques for treating and purifying contaminated aqueous solutions and remediating soil in situ by irrigating the soil and then treating the resulting contaminated aqueous solution electrolytically. As used herein, the term "contaminated aqueous solutions" refers to bulk aqueous solutions containing concentrations of colloidal particles, heavy metals, phosphate-containing species, micro-organisms, nitrogenous species, soluble organic matter, dissolved solids such as inorganic mineral salts, or any combination thereof.

BACKGROUND OF THE INVENTION

Purifying Contaminated Aqueous Solutions

Present state-of-the-art techniques for treating and purifying contaminated aqueous solutions, such as sanitary wastewater, drinking water, groundwater and landfill leachate, primarily involve bio-oxidative techniques. Application of these bio-oxidative techniques is limited by serious problems. U.S. Pat. No. 5,853,588 to Molof, et al., notes that transient conditions generate a chemical imbalance which does not allow for adequate phosphate removal. U.S. Pat. No. 5,514,277 to Khudenko describes factors that complicate anaerobic digestion in standard biological treatment.

Conventional wastewater treatment, as presently practiced, typically involves three stages, namely, primary, secondary and tertiary treatment. Some form of sludge is usually generated at each stage. Sludge is mainly a material of bacterial origin formed at all three stages of conventional treatment but largely produced from the bio-oxidative (secondary) treatment stage. Sludge, a highly viscous concentrate of settled colloidal suspension with a mushy or mud texture, is the solids material which settles out during various stages of conventional wastewater treatment and which has to be processed and dewatered prior to being hauled off site for disposal.

Conventional Wastewater Treatment Stages

Primary treatment is the first stage of the process using mechanical methods to separate and remove sand, grit and larger solids from the influent (untreated or fresh wastewater). Screens, settling tanks and skimming devices are commonly used to effectuate the separation. The solid material which settles out in this process is generally referred to as "primary sludge".

Secondary treatment follows primary treatment and typically involves bio-oxidative techniques for reducing suspended, colloidal and dissolved organic matter in the effluent emanating out of primary treatment. Bio-oxidation, at best, produces sludge and usually performs less than ideally in practice due to a number of operational problems, such as toxic loading and temperature depressions. Activated sludge and trickling filters are two of the most common means of secondary treatment. In secondary treatment, wastewater typically passes through a series of holding and aeration tanks and ponds to further remove floating and settleable solids and about 90 percent of the oxygen-demanding substances and suspended solids. Disinfection, typically by chlorination, is the final step in secondary treatment.

Tertiary treatment encompasses the additional treatment of effluent beyond that of primary and secondary treatment methods, generally by chemical or physico-chemical means. It involves selected biological, physical and chemical separation processes to remove additional pollutants such as nitrogen and phosphorous. Examples of tertiary treatment include activated carbon treatment, removal of ammonia by anaerobic denitrification, removal of phosphates by liming, and germicidal treatment by ozonolysis, ultraviolet irradiation and chlorination. All such tertiary treatments are usually very expensive to operate and most often require the addition of chemical agents which always leave some unpleasant residue in the effluent.

Conventional tertiary treatment to remove ammonia cannot proceed by the direct transformation of ammonia to nitrogen gas, but must proceed by anaerobic denitrification whereby ammonia is oxidized to terminal nitrate ion and then anaerobically converted back to nitrogen gas.

A basic problem with anaerobic denitrification is that wastewater is typically poor in carbon compounds. Biological tertiary treatment to remove ammonia requires additional carbonaceous input to insure sufficient presence of carbon to support the bacteria that carry out the treatment. Such addition of carbon results in the further production of residual solids (often referred to as "tertiary sludge"). Phosphate removal accomplished by liming also produces additional tertiary sludge.

The concentrated solids residue remaining after secondary or tertiary treatment is further processed for reuse and/or disposal. Residual solids which purportedly meet certain health and safety criteria are called "biosolids" and can be recycled as fertilizer/soil conditioner, burned to produce energy, or made into other useful products. Residual solids which do not meet such criteria are called "sludge" and must be hauled off site for disposal by means other than land application. The final solids by-product of conventional wastewater treatment systems falls within the category of sludge.

Problems with Conventional Wastewater Treatment

U.S. Pat. No. 5,837,142 to Mullerheim further describes the problems and complications associated with conventional wastewater treatment systems, which involve biological digestion of wastewater in the liquid phase. As indicated by Mullerheim, the digestion process is susceptible to disturbances of flow, nutrient loadings, temperature, chemical content, accumulated sludge levels and other influences. Digestion requires long retention times in large tanks. Close supervision of the process by skilled operators is often required for acceptable performance, although such supervision is no guarantee of a good outcome. In secondary treatment, organic nitrogenous wastes are not entirely removed by the processes, but rather, are converted into soluble nitrate compounds that could potentially pollute surface and ground waters.

The proper disposal of sludge has become a major problem by virtue of its ability to collect and retain heavy metals and toxic chemicals present in a waste stream, as well as its daunting physical properties and large water content. Incineration, landfilling, and ocean dumping all have major flaws and are strictly regulated. Due to the presence of bacteria in sludge, the impact of the disposal of sludge by land application is the likely invasion of the soil by heavy metals, toxic chemicals and pathogenic agents, in which case groundwater can be contaminated and can spread disease causing bacteria.

The problems and complications associated with conventional wastewater treatment systems are also encountered in the treatment and purification of other contaminated aqueous solutions.

Non-biological Processes

Products and processes developed for treating wastewater and other contaminated aqueous solutions by non-biological means have not found widespread use. Such approaches have involved electrolysis; the use of incineration; chemical treatment with coagulants, flocculants, adsorbants, filter aids and oxidants; radiation from nuclear sources; and physical treatments such as air flotation, filtration and centrifuging. Chemical and incineration approaches have been very expensive and energy intensive, often producing chemical laden sludges and air contaminants, which in themselves present a pollution problem. Filtration has been relatively unsuccessful because of the inability to achieve high rates of solids removal without fouling of the filters and frequent need for backwashes which in themselves create a disposal burden.

Electrolytic Removal of Contaminants

Various methods have been reported for electrolytically removing contaminants from aqueous solutions. U.S. Pat. No. 5,531,865 to Cole describes a method using an electrolytic apparatus wherein the electrodes include at least one elongate cathode and one or more elongate sacrificial floc-forming anodes aligned parallel with the cathode. The method described by Cole further includes the addition of chemical flocculating agents. In promoting both oxidation and flocculation simultaneously, without separating these two antagonistic processes, the effectiveness of both processes is substantially diminished.

The method of U.S. Pat. No. 5,531,865, as well as all other prior art electrolytic processes, such as U.S. Pat. No. 4,623,436 to Umehara and U.S. Pat. No. 3,933,606 to Harms, cannot achieve ammonia oxidation because of the presence of large amounts of organic material at the sacrificial anode.

Electrode Configuration

The operation and structure of the anode described in prior art references limits their effectiveness. For example, in U.S. Pat. No. 3,756,933, the outflow from the cathode area is merely subjected to bubbles of oxygen and chlorine from a non-sacrificial anode, without the ability to effectively utilize oxidative reactions. This limitation is due to the insufficiently intimate contact of the anolyte with the non-sacrificial anode surface. U.S. Pat. No. 4,948,489 suffers the same defect since the waste stream never contacts the anode, for a dummy anolyte is fed through the anode chamber. U.S. Pat. No. 3,756,933 uses dimensionally stable anodes of polished platinized materials, but fails to realize the benefit of having the current density on the anodes being at least on the order of 40 amps/ft$^2$.

U.S. Pat. No. 4,179,347 to Krause describes a system for disinfecting and removing suspended solids from wastewater streams such as sewage and streams containing organic matter. The configuration of the electrolytic cell used by Krause employs parallel electrode plates, with solids removal being accomplished by means of skimming, suction and screening. In particular, Krause does not appear to appreciate the benefit of separation of anode and cathode chambers by an intermediate separation membrane. Krause explicitly acknowledges that only selected nutrient-containing solids are removed by his apparatus.

Chemical Additives

Additionally, the process described by Krause requires the addition of large concentrations of sodium chloride to the feed. The addition of sodium chloride to the feed to be treated ensures the production of an effluent containing levels of chlorine-containing organic residues, chloride ions and halomethanes, which clearly does not meet current EPA standards for secondary treatment. Moreover, such chemical addition also produces a solids residue which necessarily contains chlorides and chlorinated organic species, both prohibitive contaminants by present day standards.

The use of outside chemical agents which, at least in part, ultimately end up in the effluent (treated stream), is found in many prior art references to both electrolytic and non-electrolytic methods of purifying contaminated aqueous solutions. For example, U.S. Pat. No. 4,872,959 to Herbst, et al., refers to an electrolytic treatment method employing the addition of chemical substances to effect treatment; U.S. Pat. No. No. 4,208,283 to Brozes describes a method of sanitary wastewater treatment effected by raising the pH of the stream with lime to coagulate the dissolved and suspended solids, followed by separation of the solids, and finally by the addition of chlorinating agents to disinfect the partially treated stream.

Membrane Filtration

Mullerheim, in U.S. Pat. No. 5,837,142, describes a method and apparatus for treating sanitary wastewater utilizing a membrane filtration system which separates wastewater into liquid and concentrated solids components by means of membrane filtration. Vibratory shear methods are employed to minimize fouling or blinding of the filtration medium. The resulting solids component is thereafter dried, disinfected and deodorized by a variety of methods to facilitate storage and/or disposal. The permeate produced by Mullerheim's process contains both micro-organisms and heavy metals, requiring elaborate, environmentally-sensitive and costly additive measures for purposes of disinfecting and deodorizing the permeate and chemically oxidizing putrescible compounds contained therein. The precipitate produced by Mullerheim's process is a sludge requiring elaborate and costly post-filtration treatment methods such as composting with wood processing and cement production wastes and the end result of Mullerheim's process is still sludge.

In Situ Remediation of Soil

Many different techniques have been proposed for removing contaminants from soil, all of which suffer from one or more disadvantages that have made their use either technically or economically impractical.

Some remediation techniques, such as soil washing and incineration, require the excavation and subsequent off-site treatment of the contaminated soil and are therefore unsuitable for large-scale treatment because of the immense costs associated with digging and heating. Additionally, each of these methods pose significant health hazards to workers and to the environment. In the case of incineration, a site pollution problem is oftentimes replaced with an air pollution problem.

Proposed methods for in situ soil remediation include bioremediation, injection techniques, and electrokinetics, all of which produce some form of biosolids and/or aqueous waste as a by-product, which must be further processed for reuse and/or disposal.

Bioremediation involves a biodigestive process generally utilizing bacteria and fungi. Biodigestion is dependant upon an adequate supply of heat, aeration, water and nutrients. Inadequacies in the supply of one or more of these elements will impede and eventually stop the decomposition process. Additional operational and environmental problems are posed by the difficulty in confining microbial activity within a given region and secondary contamination resulting from the inability to recover degrading bacteria once proliferated in the soil.

Techniques for injecting chemical or biological agents into soil are generally restricted to soils having relatively high hydraulic permeability, i e., relatively sandy soils, and further suffer from the difficulty of achieving a uniform distribution of the detoxifying agent(s) throughout the soil.

Electrokinetic processes generally involve the migration of contaminant-containing water through the soil under the influence of an electrical field. The water in the soil is caused to migrate toward and accumulate at or near one or more electrodes, the accumulated water therein being removed by pumps. The accumulated water must undergo extensive further treatment to reduce or eliminate the levels of contaminants contained therein.

Presently proposed in situ remediation methods, including high pressure soil flushing, vacuum or steam extraction, or radio frequency volatilization, are unable to remove some of the trace level contaminants of greatest environmental concern, such as toxic heavy metals, whose strong attachment forces bind them to the soil particles.

The ideal technique for treating and purifying contaminated aqueous solutions would be an economical, non-biological process in which all the contaminants of greatest environmental concern are either removed entirely or reduced to environmentally acceptable limits without the use of chemical additives or biologically active materials and without producing sludge as a by-product of treatment. Despite the major environmental and economic concerns associated with the handling and disposal of sludge, to date, no method of treating such contaminated aqueous solutions has been developed which accomplishes the aforementioned objectives. An object of the present invention is to provide such a method.

BRIEF DESCRIPTION OF THE INVENTION

This invention relates to the electrolytic treatment of contaminated aqueous solutions, including diffusate or leachate extracted from soil, and to a novel means of purifying such aqueous solutions without the need for chemical additives or biologically active organisms. The invention avoids creating malodorous effects or sludge as a by-product of treatment. Agglomeration of the colloidal matter in contaminated aqueous solutions is achieved by the use of the electrolytic unit of the present invention and the presence of sufficient cations within the feed solution to be treated.

The genesis of this invention was the realization that most natural contaminants in contaminated aqueous solutions are negatively charged colloidal particles, that neutral colloidal particles in such aqueous solutions can be altered so as to acquire a negative charge, and that a system designed to exploit these negative charge characteristics would satisfy the long felt need for a decontamination and remediation system that avoids sludge production and the use of chemical additives or biologically active materials.

The present invention rests in part upon the discovery that the surface layer of colloidal particles, whether hydrophobic, hydrophilic, or a combination of both, can be permanently altered in such a way as to cause total and irreversible colloidal destabilization (agglomeration) of all the colloidal material present in an aqueous solution without the use of chemical additives. This novel phenomenon is apparently accomplished as a result of some, if not all of the chemical and physico-chemical reactions that the present invention causes to occur at the cathode-solution interface of an electrolytic cell.

The invention, embodied in a treatment unit apparatus, involves several unique concepts. The invention employs a unique electrolytic cell and cathode configuration to bring about the agglomeration of colloidal particles in the contaminated aqueous solution within a cathode chamber. It does this by producing hydroxyl ions from the electrolysis of water and by incorporating positive charge centers throughout the surface of the grossly negative cathode. The preferential adsorption of the hydroxyl ions to the material surface of all the colloidal particles in the aqueous solution ensures that all such colloidal particles are electronegative in nature. The positive charge centers on the cathode surface drive the migration of negatively charged colloidal particles into the cathode-solution interface along with cationic matter which is migrated therein by normal electrolytic transference. The co-concentration achieved by these parallel processes causes the compression (collapse) of the Gouy-Chapman layer about the colloidal particles and their agglomeration within the cathode-solution interfacial zone.

The configuration of the cathode (a V shaped configuration), within a cathode chamber, assures that hydrogen bubbles evolved from the electrolysis of water will move colloidal particles in a steady state stream within the cathode-solution interface. The positive charge centers on the cathode surface attract negatively charged colloidal particles into the cathode-solution interface so that a steady agglomeration process continuously occurs. The spent catholyte is then fluidly transported from the treatment unit's electrolytic cell to a filter chamber where solids are removed.

A feature of the invention is the separation of the cathode chamber from an anode chamber by a membrane of submicron porosity. This physically separates the agglomeration process from oxidation processes within the anode chamber of the electrolytic cell and restricts osmotic reflex (from anode to cathode chamber). Agglomeration and oxidation are contrary processes, one involving the building up of larger structures, the other the breaking down of structures, and their separation in this invention is particularly advantageous.

Another feature of the invention is the maintenance of a high pH at the cathode, which enables the total and irreversible agglomeration of all the colloidal particles to occur at the cathode-solution interfacial zone and which simultaneously enables the precipitation of phosphates, the denaturing of microbiological material and the hydrolysis of urea to ammonia.

In lieu of changing the electrical potential applied to the electrodes of the electrolytic cell, the treatment unit may include mechanical means for adjusting the flow rate of the feed solution through the cathode chamber of the electrolytic cell in order to maintain the pH level of the cathode chamber in a predetermined range.

Still another feature of the invention is the maintenance of a high current density on the anode, which facilitates the oxidation of ammonia to nitrogen gas and also produces chloric acid in the anode chamber to oxidize any residual soluble organic material and to act germicidally.

Additionally, the invention provides a fluid flow path from the cathode chamber through a filtration system with a return to the anode chamber, enabling the separation of the solid content of the spent catholyte, which includes, as a result of this process, the colloidal particles removed from the infeed.

The invention also contemplates an injection unit for adding cations in the feed in order to insure that the co-concentration of the colloidal particles and cationic matter in the cathode-solution interface is of sufficient strength to cause the collapse of the Gouy-Chapman layer about the colloidal particles.

The invention provides an electrolytic treatment unit that includes an electrolytic cell having a cathode chamber and an anode chamber separated from the cathode chamber by a separation membrane of sub-micron porosity, an electrical circuit for providing an electrical current through the electrolytic cell by applying a direct electrical potential across the electrodes of the electrolytic cell, a spent catholyte holding tank fluidly connected to receive catholyte from the cathode chamber, a filter chamber fluidly connected downstream from the spent catholyte holding tank, an anode feed holding tank fluidly connected downstream from the filter chamber and a flow control valve to stabilize the flow from the anode feed holding tank to the anode chamber. The filter chamber contains a membrane filtration medium which separates a clarified liquid collection zone from a precipitate collection zone in the filter chamber. Of course, the filter chamber need not be a simple structure, but may have its various components distributed among fluidly connected components. A pump directs the flow of spent catholyte slurry (unfiltered liquid) from the spent catholyte holding tank to the filter chamber and through the membrane filtration medium at a predetermined pressure or rate. The clarified liquid collection zone in the filter chamber is fluidly connected to an anode feed holding tank. Anolyte from the anode feed holding tank is fed to the anode chamber of the electrolytic cell preferably by gravity flow through a flow control valve. Precipitate from the precipitate collection zone of the filter chamber is removed and collected in a solids holding tank, after which it can be further processed to extract heavy metals, if desired.

The treatment unit preferably also includes a unique method for back-pulsing liquid through the membrane filtration medium to unbind the filter material that requires only one valve and no compressed air assist, in contrast with known back-pulsing methods. Means may also be provided for injecting agents, such as mineral acid, into the filter chamber for cleaning the membrane filtration medium of blocking compounds, such as calcium carbonate or ferric hydroxide.

To deal simultaneously with the phosphate contaminants, the electrical current that electrolyzes the water molecules produces hydroxyl ions in the cathode-solution interfacial zone, thereby raising the pH. This high pH further converts phosphate ions into orthophosphate resulting in the precipitation of phosphate as alkaline earth phosphate.

The hydroxyl ions produced from the electrolysis of water serve an additional significant purpose. In the case of colloidal particles in aqueous solutions, whether hydrophobic or hydrophillic, the preferential adsorption of hydroxyl ions to the material surface of all such colloidal particles ensures that all such colloidal particles, even neutral colloidal particles, will acquire a negative charge.

The chemical transformations occurring simultaneously at the cathode-solution interface further result in the denaturing of micro-organisms and the removal of dissolved inorganic solutes in the form of water hardness from the feed, thus lowering the Total Dissolved Solids ["TDS"]. This is in direct contrast to conventional treatment methods, which do not denature and which raise the level of TDS in order to precipitate phosphate. The treatment unit also includes apparatus for measuring and controlling the pH level in the cathode chamber.

These are the main features of the apparatus and process. Others are described in the detailed description of the invention.

Accordingly, it is an object of this invention to provide a process and apparatus for treating and purifying contaminated aqueous solutions containing concentrations of colloidal particles by a non-biological process which utilizes one or more electrolytic cells designed to agglomerate the colloidal particles within an interfacial zone adjacent a cathode and does not require the use of chemical additives or flocculants.

It is a further object of this invention to provide a process and apparatus for treating and purifying contaminated aqueous solutions in an electrolytic cell wherein a cathode chamber and at least one anode chamber are separated by a separation membrane whose structure allows conductivity driven ionic transfers, contains the colloidal particles within the cathode chamber so that they can be agglomerated and subsequently harvested by filtration, and restricts osmotic reflux.

It is a further object of this invention to provide a configuration for the cathodes that contributes to a steady state flow of colloidal particles and cations in the cathode-solution interface within the electrolytic cell sufficient to collapse the Gouy-Chapman layer about the colloidal particles, thereby bringing about total and irreversible agglomeration of the colloidal particles.

It is a further object of this invention to provide a means for increasing the quantity of cations in the aqueous feed solution in order to insure that the co-concentration of the colloidal particles and cationic matter in the cathode-solution interface causes the collapse of the Gouy-Chapman layer about the colloidal particles.

It is a further object of this invention to provide an electrolytic treatment system wherein a stable flow (moderated if necessary by a flow control valve or other such fluid control means) of fluid through the system provides that the agglomerated colloidal particles are removed by filtration from the catholyte.

It is a further object of this invention to provide for the electrolysis of water in such a treatment system and the production of hydroxyl ions at the cathode of an electrolytic cell whereby the preferential adsorption of hydroxyl ions to the material surface of the colloidal particles contained in the contaminated aqueous solution ensures that all such colloidal particles, including neutral colloidal particles, will acquire a negative charge.

It is a further object of this invention to provide for the electrolysis of water in such a treatment system and the generation of hydrogen bubbles in such a form as to drive the steady state non-turbulent circulation of colloidal particles in the cathode solution interface and to raise the transient pH in the cathode solution interface above 12 in order to bring about the precipitation of phosphates as alkaline earth phosphates and the denaturing of microorganisms and any other material of biological origin.

It is a further object of this invention to provide a means of using electrolytic cells for the de-solubilizing of phosphates and the denaturing of micro-organisms and any other material of biological origin.

It is a further object of this invention to provide an electrolytic treatment system that oxidizes ammonia to nitrogen gas and also produces chloric acid in the anode chamber to oxidize any residual soluble organic material and to act germicidally.

It is a further object of this invention to provide a means of using electrolytic cells for the hydrolysis of urea to ammonia and the oxidation of ammonia to nitrogen gas.

It is yet a further object of this invention to provide a method for using the electrolytic treatment system of the present invention to remediate soil contaminated with sludge and/or environmental pollutants.

It is yet a further object of this invention to provide a method for using the electrolytic treatment system of the present invention to treat and purify diffusate or leachate extracted from soil that is contaminated with concentrations of colloidal particles, heavy metals, phosphate-containing species, micro-organisms, nitrogenous species, soluble organic matter, dissolved solids such as inorganic mineral salts, or any combination thereof.

It is a further object of the invention to provide a final effluent from the anode chamber that is entirely free of micro-organisms (and any other material of biological origin) and heavy metals, has low enough concentrations of organic carbon, nitrogen, phosphorous and TSS to allow for its direct discharge to the environment in compliance with current applicable discharge regulations, and is non-infectious and nonmalodorous.

These and other objects of the invention will become more apparent from the description of a detailed embodiment below.

DETAILED DESCRIPTION OF PREFERRED EMBODIMENTS

Theoretical Basis

Figure 1:
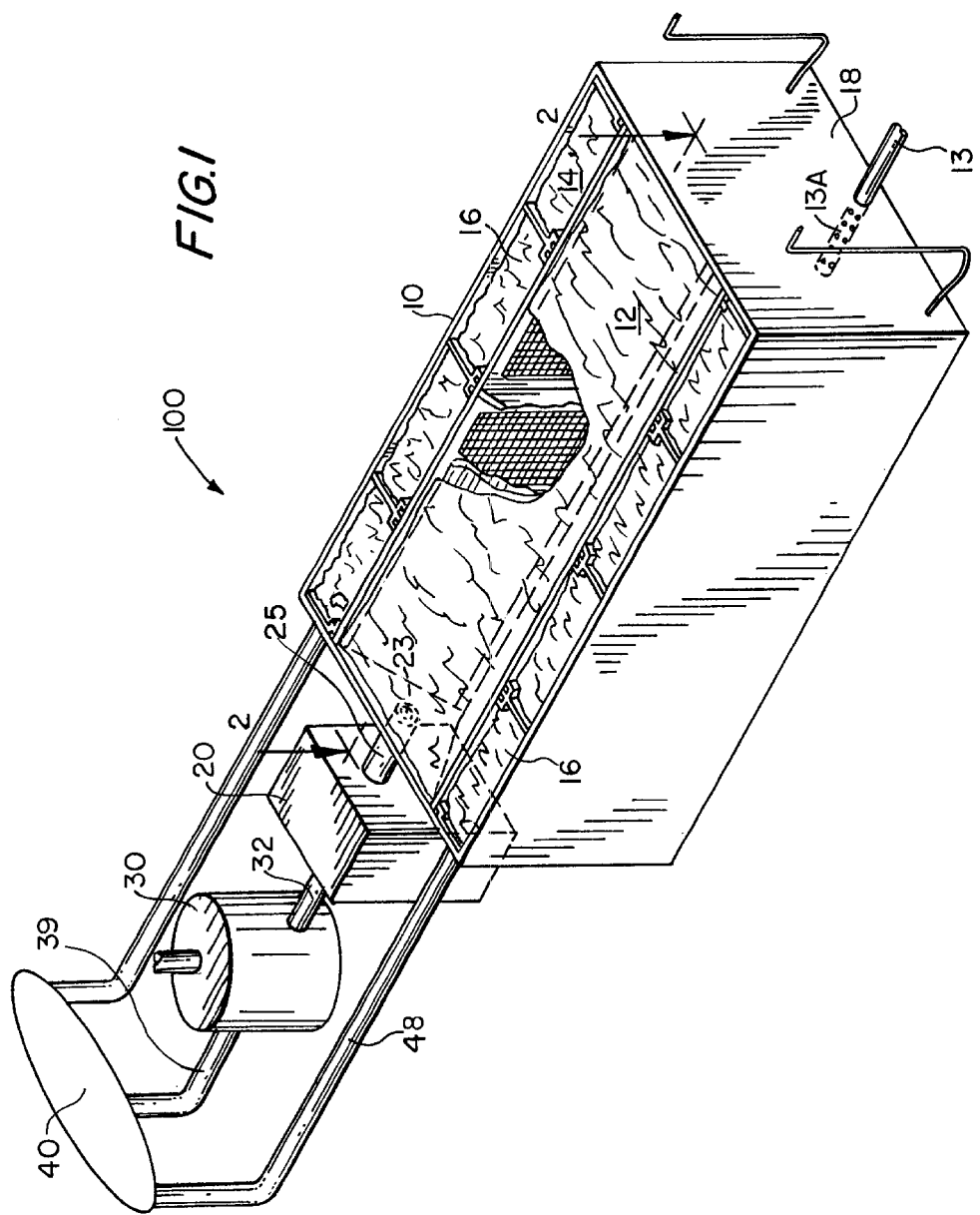
FIG. 1 is a perspective view of the treatment unit of the present invention.

The development of a method for treating contaminated aqueous solutions started from the realization that the main pollutional components typically found in contaminated aqueous solutions, such as sanitary wastewater, drinking water, groundwater and landfill leachate, are colloidal in nature, thereby rendering such solutions colloidal dispersions. Previous to this invention, it seems not to have been appreciated how the fact that all the colloidal particles contained in such contaminated aqueous solutions can be made electronegative in nature could be used to develop a superior treatment process. This negative charge effect results from the preferential adsorption of hydroxyl ions to the material surface of colloidal particles in aqueous solutions, which renders neutral colloidal particles electronegative in nature and negatively charged colloidal particles more electronegative in nature. Although nitrogen present in these colloidal particles can be made electropositive, this can only occur under conditions of extremely low pH, which conditions are not encountered in the case of bulk aqueous solutions such as sanitary wastewater, drinking water, groundwater and landfill leachate.

A novel technique for the treatment of contaminated aqueous solutions, such as sanitary wastewater, drinking water, groundwater and landfill leachate, has been developed based in part on an enhanced understanding of colloidal stability and the discovery that the charge to charge distribution on the surface of negatively charged colloidal particles can be altered in such a way as to cause total and irreversible agglomeration of the colloidal particles at the negative electrode of an electrochemical cell, without the addition of chemical agents.

The key to the development of the electrolytic treatment unit of the present invention begins with a model of a negatively charged colloidal particle which has a firmly attached layer of positive counter ions. This firmly attached layer is called the Stem layer. A diffuse layer of much larger diameter than the Stem layer which is preponderantly positively charged is called the Gouy-Chapman layer. It is in this diffuse layer (the Gouy-Chapman layer) that the attraction dynamics are created with the dispersion medium, thereby generating the forces necessary for colloid stability. DLVO theory shows how the increase in ionic solute concentration compresses the Gouy-Chapman layer, diminishing the attraction dynamics between the colloid and the dispersion medium. As this compression proceeds, a point is reached where the van der Waals attraction becomes dominant; it is at this point that the colloidal particles coalesce ("agglomeration"). The agglomeration of the formerly dispersed material now enables it to be harvested mechanically, preferably by filtration.

A colloid consists of dispersed matter in a given medium and is usually defined as a disperse system with at least one characteristic dimension in the range $10^{-7}$ to $10^{-4}$ centimeter. In the case of finely subdivided particles, classification of a number of colloid systems is possible. Unlike many such systems, the colloid system found in contaminated aqueous solutions is free flowing. The low viscosity of such solutions enables them to be treated and purified in accordance with the present invention.

Most often, the novelty of an invention relates to the hitherto unforeseen application of a previously reported phenomenon. In describing a method whereby negatively charged colloidal particles can be agglomerated at the negative electrode of an electrolytic cell, the present invention describes another phenomenon that to the recollection of the inventors has never before been reported. Prior art references to colloidal agglomeration at electrodes have apparently all been of the charge neutralization type, i.e., negatively charged colloidal particles agglomerating at the positive electrode of an electrochemical cell. See Van Nostrand, Encyclopedia of Chemistry, 4th Ed., pp. 272–276.

By sequentially isolating the two processes of oxidation and agglomeration, and by the further employment of a novel cathode, the present invention does not require the addition of any chemical flocculating agents. Rather, in the present invention, the process of agglomeration occurs by the novel means of co-concentrating the resident cationic and colloidal matter of the aqueous solution at the cathode-solution interface of an electrolytic cell. Moreover, by removing virtually all carbonaceous organic matter prior to anodic oxidation, the present invention allows the anodic oxidation process to focus exclusively on the oxidation of ammonia to nitrogen gas, thereby achieving one of the major objectives of conventional tertiary treatment without reliance upon chemical additives. The conditions created at the cathode-solution interface also enable the precipitation of heavy metals and alkaline earth phosphates and some of the dissolved inorganic solids. These conditions also result in the denaturization of microbiological matter and the hydrolysis of urea to ammonia, which renders the nitrogen susceptible to subsequent electrochemical oxidation.

Embodiment Configuration

A preferred embodiment of the present invention may be understood by making reference to the drawings. The electrolytic treatment unit 100 of the present invention is illustrated in FIGS. 1–9.

The treatment unit 100 includes an electrolytic cell 10, a spent catholyte holding tank 20, a filter chamber 30, comprising a membrane filtration medium 34 which divides a clarified liquid collection zone 36 and a precipitate collection zone 38. The electrolytic cell 10 comprises a cathode chamber 12 and two anode chambers 14. Each anode chamber 14 is separated from a cathode chamber 12 by a filter membrane 16 best seen in FIG. 3. The treatment unit 100 is suitable for on-line fluid connection via header pipe 13 with the contaminated aqueous feed solution 11 to be treated. The header pipe 13 enters the cathode chamber 12 of electrolytic cell 10 and terminates in a perforated portion 13A of header pipe 13 so as to distribute its contents along the portion of its length within the electrolytic cell 10. The header pipe 13 is arranged at a first end 18 of cathode chamber 12. The aqueous feed solution 11 entering through header pipe 13 moves upward across cathode plates 22, as can perhaps be better seen in FIG. 3. An electrical potential source (not shown) applies current to anodes 15 and cathode plates 22 of the electrolytic cell 10.

Contaminated aqueous feed solution 11 treated in cathode chamber 12 passes through outlet 23 at a second end 19 of cathode chamber 12 through a pipe or conduit 25 into spent catholyte holding tank 20, after which it passes through a pipe or conduit 32 to filter chamber 30. Filtrate or clarified liquid 31 from filter chamber 30 passes through outlet port 37 into pipe or conduit 39 leading to anode feed holding tank 40 and then, through flow control valve 47 preferably by gravitational flow, passes as anode feed solution 41 into anode chamber 14.

In the preferred embodiment, since the anode feed solution 41 enters the anode chamber 14 from the anode feed holding tank 40 by means of gravitational flow through piping 48, the anode feed holding tank 40 is preferably situated atop anode chamber 14. However, the anode feed holding tank 40 may be a separate structure or structures spaced from anode chamber 14 so long as sufficient means are provided for the assisted flow of the anode feed solution 41 from the anode feed holding tank 40 into anode chamber 14.

Each anode chamber 14 comprises anodes 15, preferably in the form of anode wires attached to the electrical potential source (not shown). Spent anolyte 60 exits each anode chamber 14 at anode output 17, as shown in FIGS. 2,3,6 and 7.

Cathode Design

Figure 6:
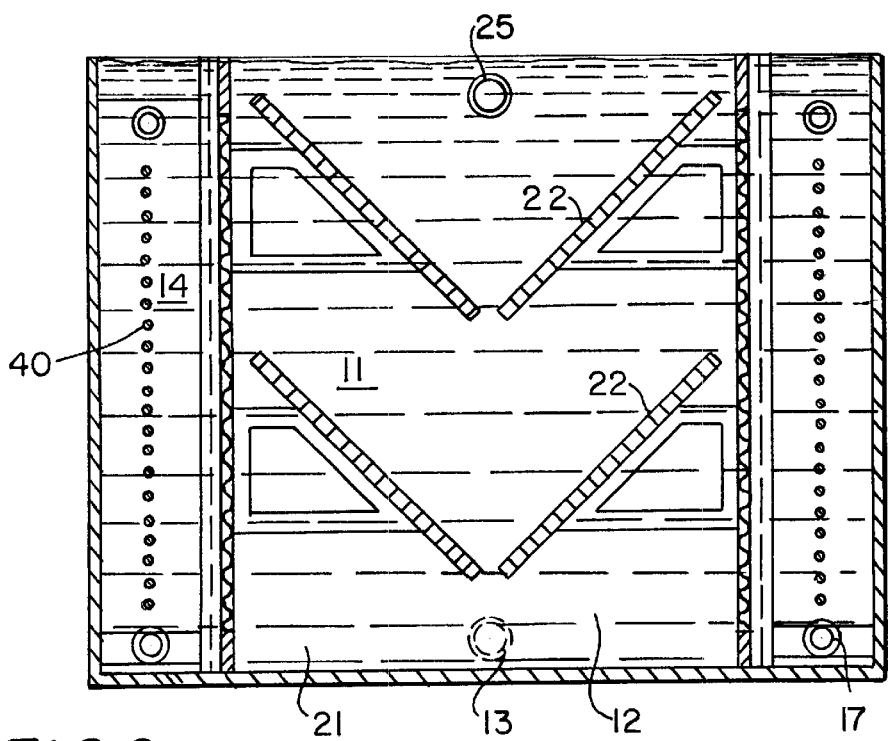
FIG. 6 is a front section view of an alternative embodiment of an electrolytic cell of the present invention having multiple stacked cathode plates.

As shown in somewhat more detail in FIG. 6, cathode chamber 12 can comprise one or more pairs of cathode plates 22 arranged at an angle to the perpendicular or vertical axis of the electrolytic cell 10. Cathode plates 22 are arranged in a suitable manner to encourage sufficient and appropriate contact with the aqueous feed solution 11, with input or header pipe 13 and output pipe 25 being arranged distant from each other to promote contact of the aqueous feed solution 11 with cathode plates 22.

The cathode plates 22 comprise one or more metals selected from the group consisting of titanium, yttrium, zirconium, hafnium, niobium, and tantalum. These metals are known as "valve metals", which manifest certain anodic oxide film characteristics. Although aluminum is a valve metal which manifests the same anodic oxide film characteristics as the other valve metals, its use in this application is discouraged at the present time because, unlike the other valve metals, aluminum would dissolve in the presence of the hydroxyl ions produced by the electrolysis of water. If this property could be overcome, such as by alloying the aluminum with one of the other six valve metals, then aluminum as well might be suitable.

Prior to placement of a cathode plate formed from one or more of the aforementioned valve metals into the cell, the cathode plate is subjected to air oxidation at an elevated temperature of up to 600° C., to build an irreducible oxide coating on the metal surface of said cathode plate. The desired irreducible oxide coating can also be prepared by other means, such as chemical treatment. The oxides of these valve metals are highly ionic, i.e., they all have high melting points, high heats of formation ($\Delta H°_F$) and low intrinsic electrical conductivity. Further, they are not reducible by electrochemical action in aqueous solution. Because of their high valences, the highly electronegative oxygen imposes a high positive charge density on the surface metal ions. It is believed that this high positive charge density assists the observed agglomeration of the colloidal particles, as other metal cathodes so oxidized do not perform this function. The valve metals and their irreducible oxide coatings provide sites on the cathode that are attractive to the negatively charged colloidal particles. These sites enable the formation of an interfacial zone at the surface of the cathode at which colloidal particles may combine with cations to cause the formation of colloidal agglomerates that may be filtered from the spent catholyte leaving the cathode chamber.

The aforementioned valve metal oxides are oxides capable of existing cathodically under the conditions of the hydrogen evolution reaction [hereinafter "HER"]. The mechanism for the HER on such oxides is fundamentally different from the HER for other usually metallic cathodes. In the far more prevalent case of metallic cathodes, the HER involves intermediate metal hydride formation. See Vijh, *Electrochemistry of metals and Semiconductors,* 1973, pp. 167 et seq. The formation of metal hydride at the cathode surface would discourage the occurrence of the two essential operational features of the present invention, namely, the electrostatic potential interaction of the cathode surface with the negative colloidal particles and the generation of microbubbles (bubbles generally unobservable to the naked eye) needed to efficiently drive the non-turbulent steady state convective flow about the cathode plates. Again, if these properties could be overcome (not believed possible at present) additional material might be useful with this invention.

The non-turbulent flow of colloidal particles and cations into the cathode-solution interface is driven by the evolution of hydrogen from the electrolysis of water and achieves a steady state in which colloidal particles and cations from the feed are brought into the cathode-solution interface, at which point the Gouy-Chapman layer about the colloidal particles collapses, the colloids agglomerate along with the cations, and the agglomeration becomes irreversible, i.e., the agglomerated material comprising all of the resident colloidal particles and cations is not redistributed into the bulk solution.

The present invention concentrates the colloidal particles and the cationic species in an interfacial zone between the cathode and the bulk of the dispersing medium. Because of the positive centers of charge on the oxidized surface of the valve metal cathode, the negative colloidal particles are electrostatically attracted to that surface. At the same time, cationic species migrate to the cathode-solution interface by normal electrolytic action. If the applied electrical potential is electropotentials are sufficiently high, i.e., above 4 volts, it becomes possible to migrate sufficient concentrations of cations to the interfacial zone so as to cause the colloidal particles in the zone to agglomerate. Agglomeration so achieved is irreversible even though the agglomerated colloidal particles migrate out of this interfacial zone.

Membrane Design

The separation membrane employed between the cathode and anode chambers may be any membrane whose structure is suitable to allow conductivity driven ionic transfers, contain the colloidal particles within the cathode chamber so that they can be agglomerated and subsequently harvested by filtration, and restrict electro-osmotic reflux (from anode to cathode chamber) which would disrupt the desolubilization of phosphates and the agglomeration of the colloidal particles. A preferred separation membrane comprises a membrane of submicron porosity.

The separation membrane positioned between the cathode and anode chambers should meet strict requirements when it comes to porosity specifications. The reason for this is the phenomenon of electroosmosis, i.e., the motion of the aqueous (dispersion) phase through the pores (dispersed phase) or capillaries of a membrane. The motion is from an anode chamber into a cathode chamber, and it will greatly diminish the pH difference between the chambers if electroosmotic reflux becomes significant.

Membranes are made from materials of relatively great electronegativities so that the water in contact with the membrane capillaries will acquire a positive orientation in accordance with Helmholtz double layer theory. On applying an external emf, the oppositely charged layers of the liquid will be attracted to the opposite poles of the cell. If the capillary is held stationary, the liquid will move through the capillary. The velocity of motion is given as:

$$v = \frac{\zeta \times D}{4\pi\eta} \quad (1)$$

where $\zeta$=electrokinetic potential; D=dielectric constant of water; $\eta$=viscosity of water.

If the Volume $V=\pi r^2 v$, the volume which flows through a capillary is given as:

$$V = \zeta \frac{r^2 \chi D}{4\eta} \quad (2)$$

where r=radius of capillary; $\zeta$=electrokinetic potential; $\chi$=field strength.

The flow is proportional to the field strength and to the square of the capillary radius. If the radius is held below $0.5\mu$ (microns), the flow through the membrane is negligible for the field strengths employed. The present invention preferably utilizes such a membrane in order for the pH conditions necessary for the appropriate chemical transformations to be met.

Cathode Plate Placement

Figure 2:
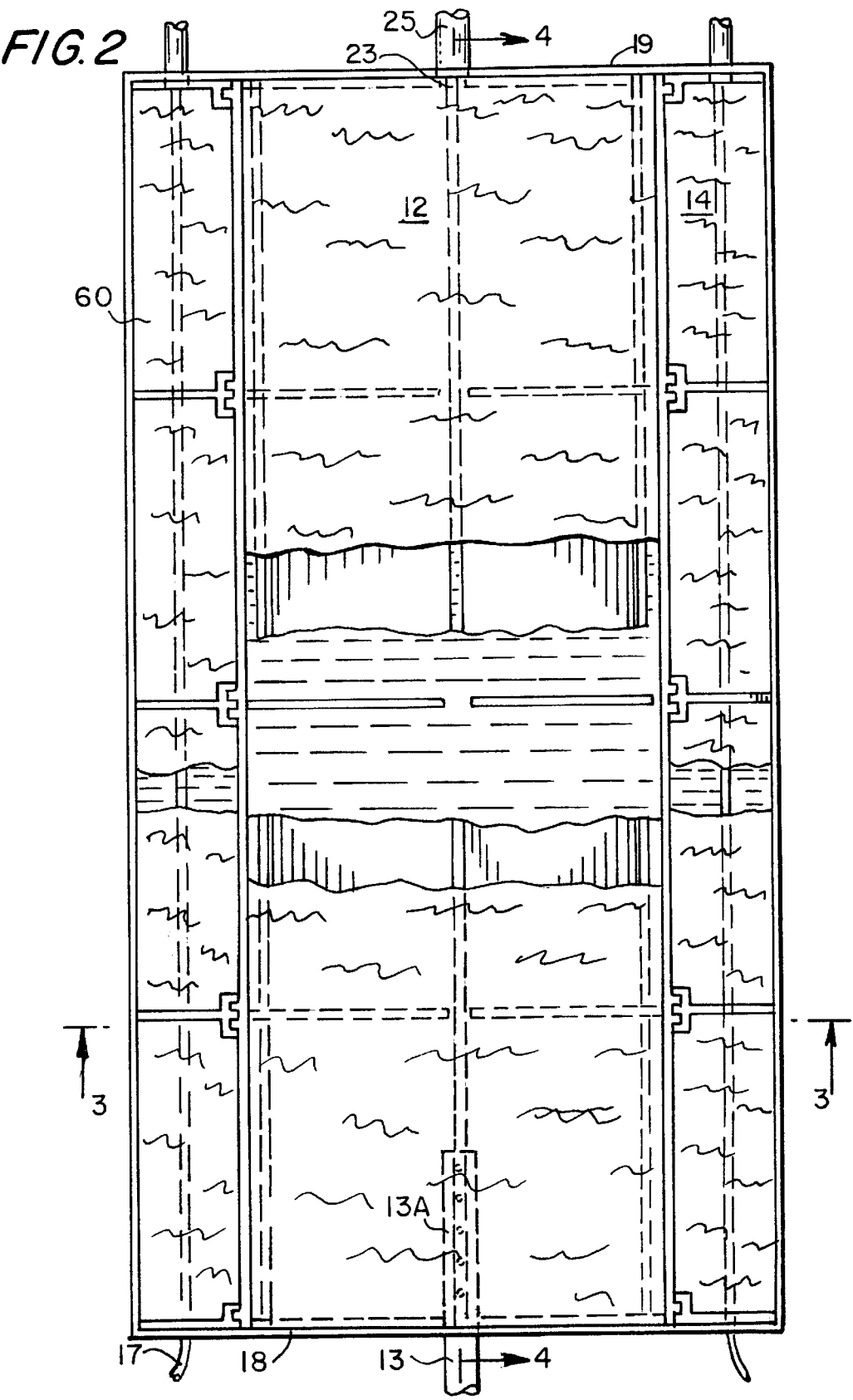
FIG. 2 is a top view of the electrolytic cell of the present invention.
Figure 3:
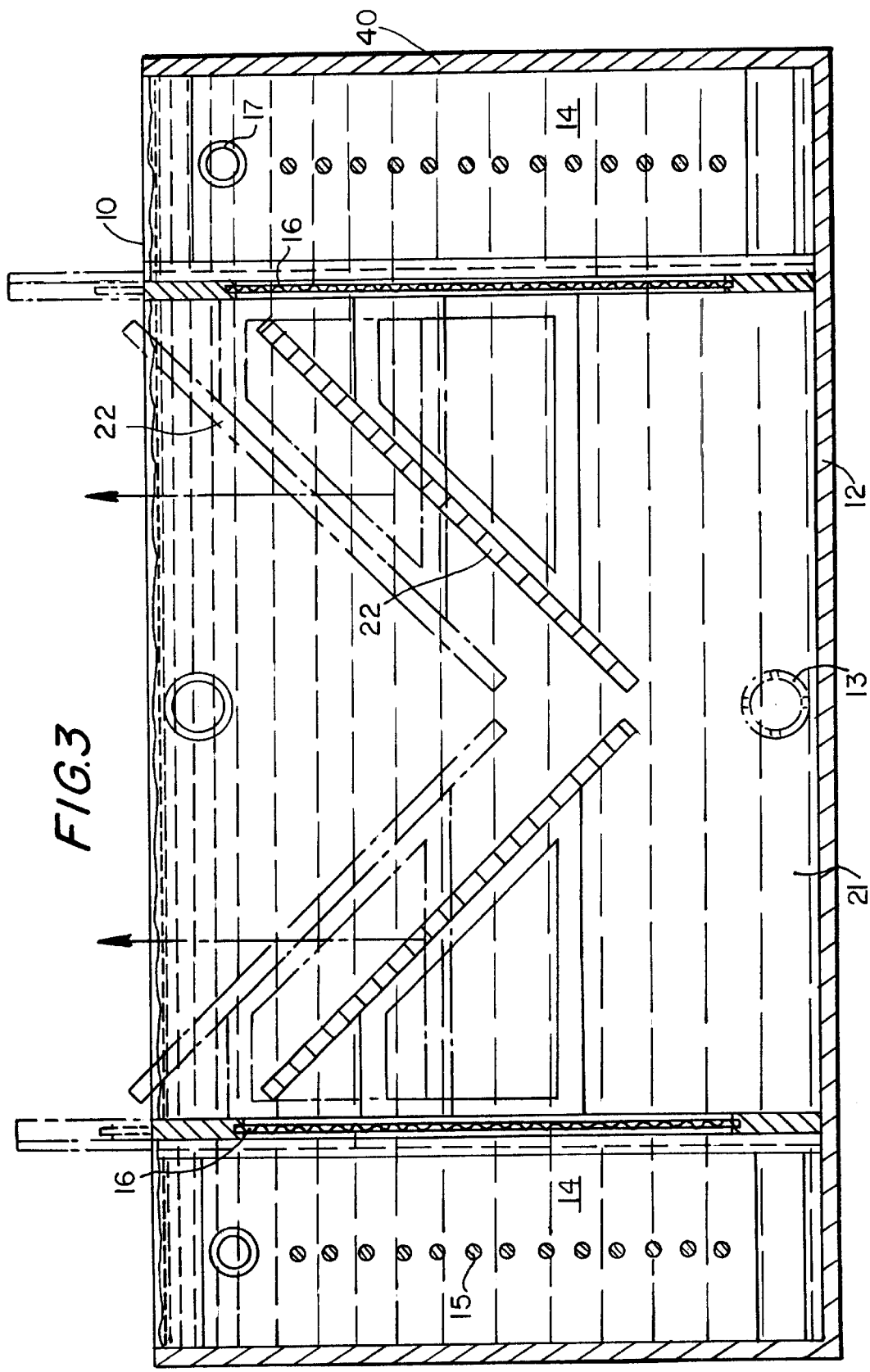
FIG. 3 is a front section view of the electrolytic cell of the present invention.
Figure 4:
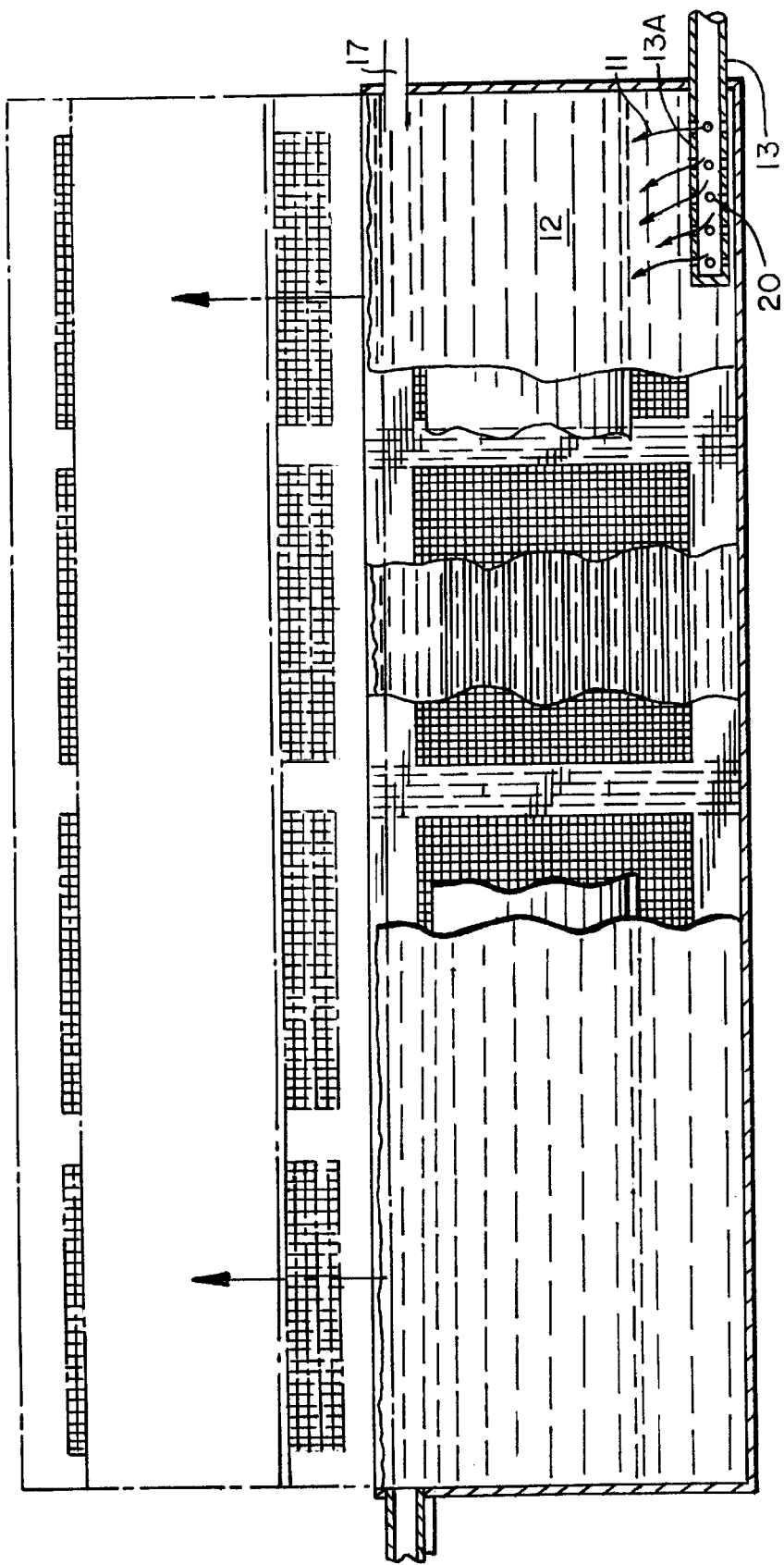
FIG. 4 is a side section view of the electrolytic cell of the present invention.
Figure 5:
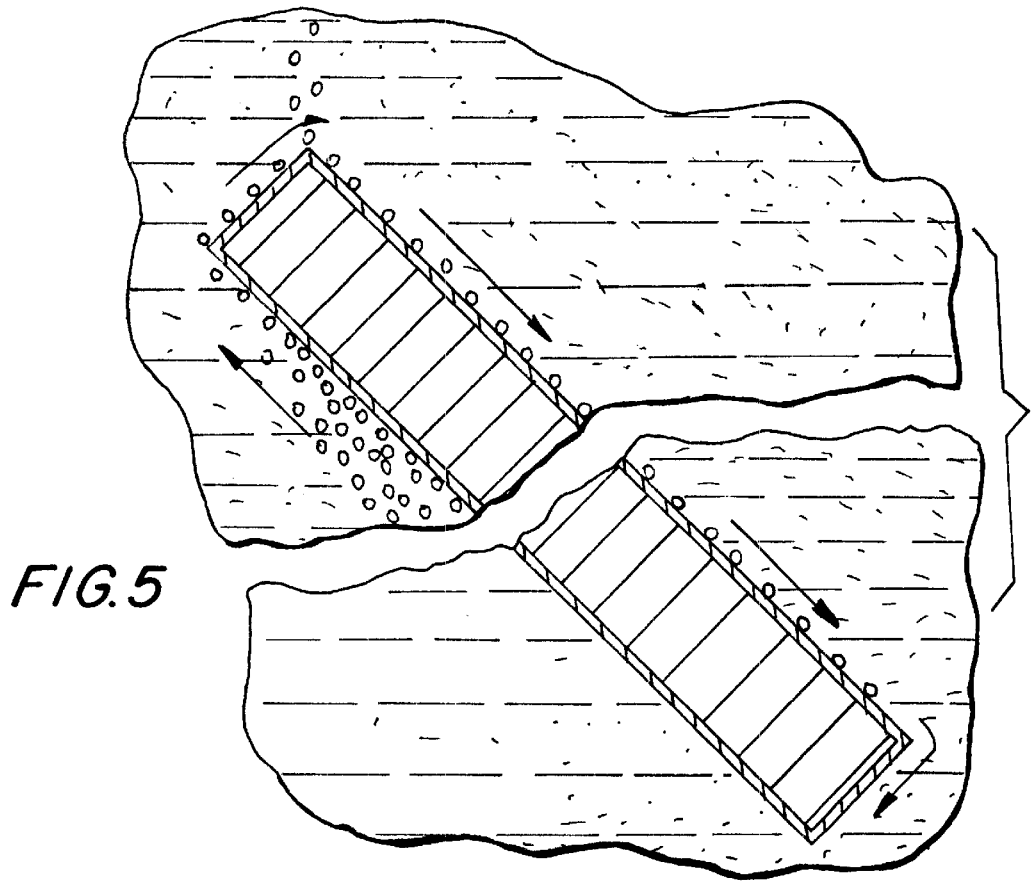
FIG. 5 is a view of a section of a cathode plate of the present invention.

The placement of the cathode plates is shown in FIGS. 2,3 and 6. The circulation of the aqueous feed solution onto the cathode surface is driven by convective action. By placement of the cathode plates in a "V"-shaped manner, each arm of the "V" screens the back (i.e., the upper surface) of the other arm, thereby minimizing electrolytic action on the back of each cathode arm and ensuring that the direction of flow moves upward across the lower surface of the cathode plates. This "V"-shaped configuration essentially impedes or minimizes the electrolytic action which would otherwise counter the desired convective flow and disrupt the proper mass transfers within the cathode chamber.

To be most effective in its function of causing agglomeration of the colloidal particles in contaminated aqueous solutions, each pair of cathode plates within a cathode chamber should be arranged in an upright "V" shaped manner so that the top of the "V" is adjacent to the separation membrane and so that each cathode arm of the "V" screens the back of other arm, with each such cathode plate inclined at an angle to the perpendicular or vertical axis of the cell, for example, in the range of from about 10° to 80° relative to the perpendicular of the cell, preferably from about 25° to 65°, more preferably from about 40° to 50°. The effect of this cathode inclination is to enhance the critical process of agglomeration, i.e., the breaking of the electrical interaction that stabilizes the colloidal dispersion. There is a convective process which is caused by the formation and rising of hydrogen microbubbles at the cathode surface. As these microbubbles rise they draw solution along with them by frictional drag. The solution rises with the microbubbles until the microbubbles break free at the top edge of the cathode plates, at which point, by displacement, the solution is driven down and thence around the front of the cathode plates in a cyclic process. The colloidal particles are thus circulated over the cathode surface on a continuous basis for the duration of their detention in the cathode chamber, generally about one hour.

The inclination of the cathode plates also facilitates phosphate removal from contaminated aqueous solutions by preventing the cathode-solution interfacial zone from dissipating as easily as it might were the cathode plates kept in a vertical mode.

Anode Design

The anodes 15 preferably have a smooth surface area that is less than one percent (1%) of the surface area of the cathode plates. This surface area restriction is intended to assure that the current density at the anodes will be at least forty (40) amps/ft.$^2$ (with a preferred range above 50) at all times, i.e., even when the electrical potential is downwardly adjusted to achieve the desired pH level in the cathode chamber.

In a preferred embodiment shown in FIGS. 3 and 6, anodes 15 are depicted as pairs of wires arranged vertically. However, anodes 15 can be configured in any conventional way so long as the chemical inertness and oxygen polarization prerequisites are met and so long as appropriate contact is made with the anode feed solution 41.

Cell Arrangement

Figure 7:
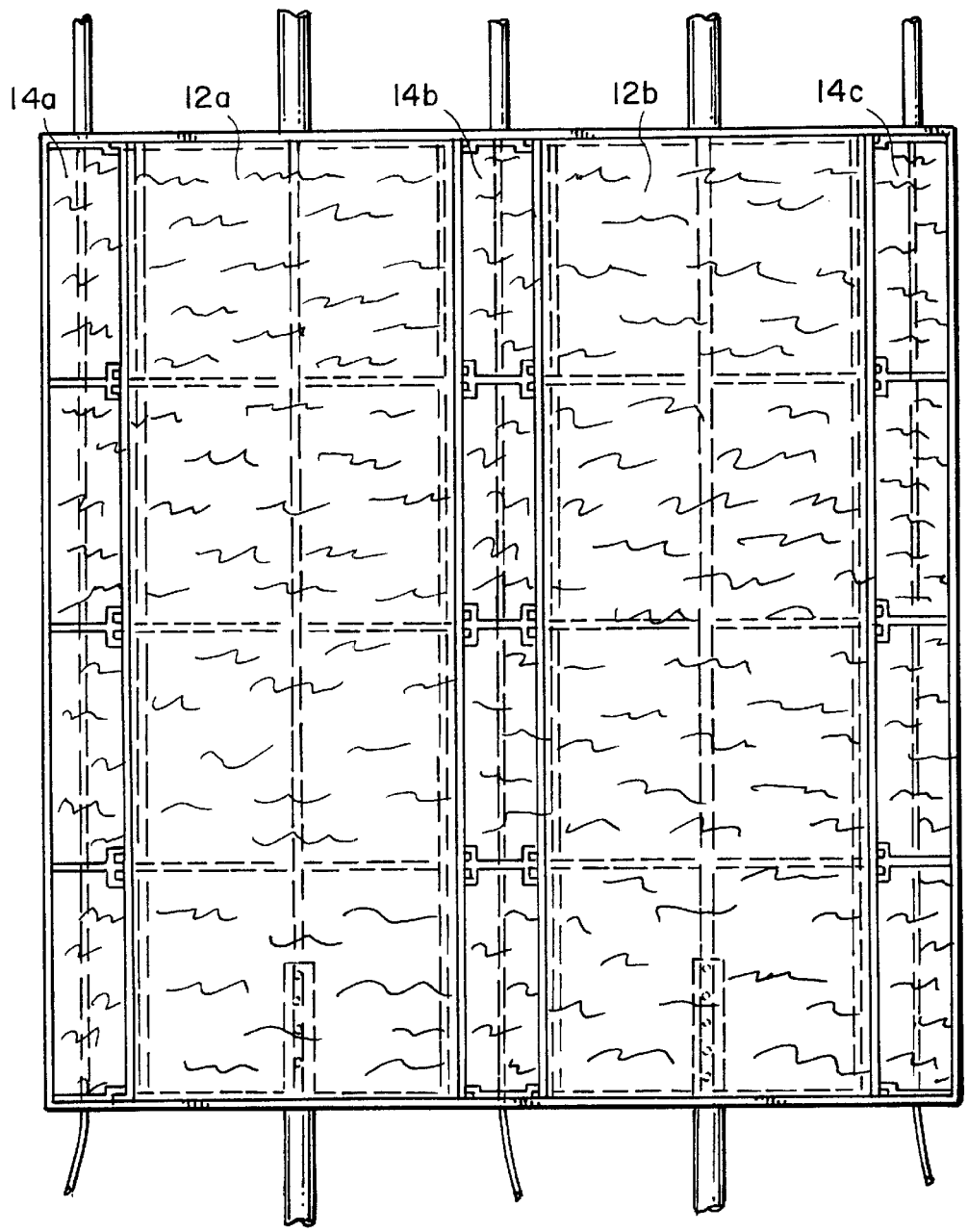
FIG. 7 is a top view of an electrolytic cell of the present invention having multiple cathode chambers.

The electrolytic cell system according to the present invention can comprise any number of cathode chambers and anode chambers, so long as each cathode chamber is separated from at least one anode chamber by a separation membrane of submicron porosity. FIG. 7 shows a configuration in which there are two cathode chambers 12a and 12b and three anode chambers 14a, 14b, 14c, with piping corresponding to that of the single chambered embodiment shown in FIG. 2. As shown in FIG. 7, the individual cathode plates 22 are positioned at an angle of approximately 45° to the perpendicular or vertical axis of the cell.

It is included within this invention that the electrolytic treatment unit of the present invention can be constructed so that two or more electrolytic cells can feed a common spent catholyte holding tank, a common filtration chamber, a common solids holding tank and a common anode feed holding tank.

The Spent Catholyte Holding Tank

Figure 8:
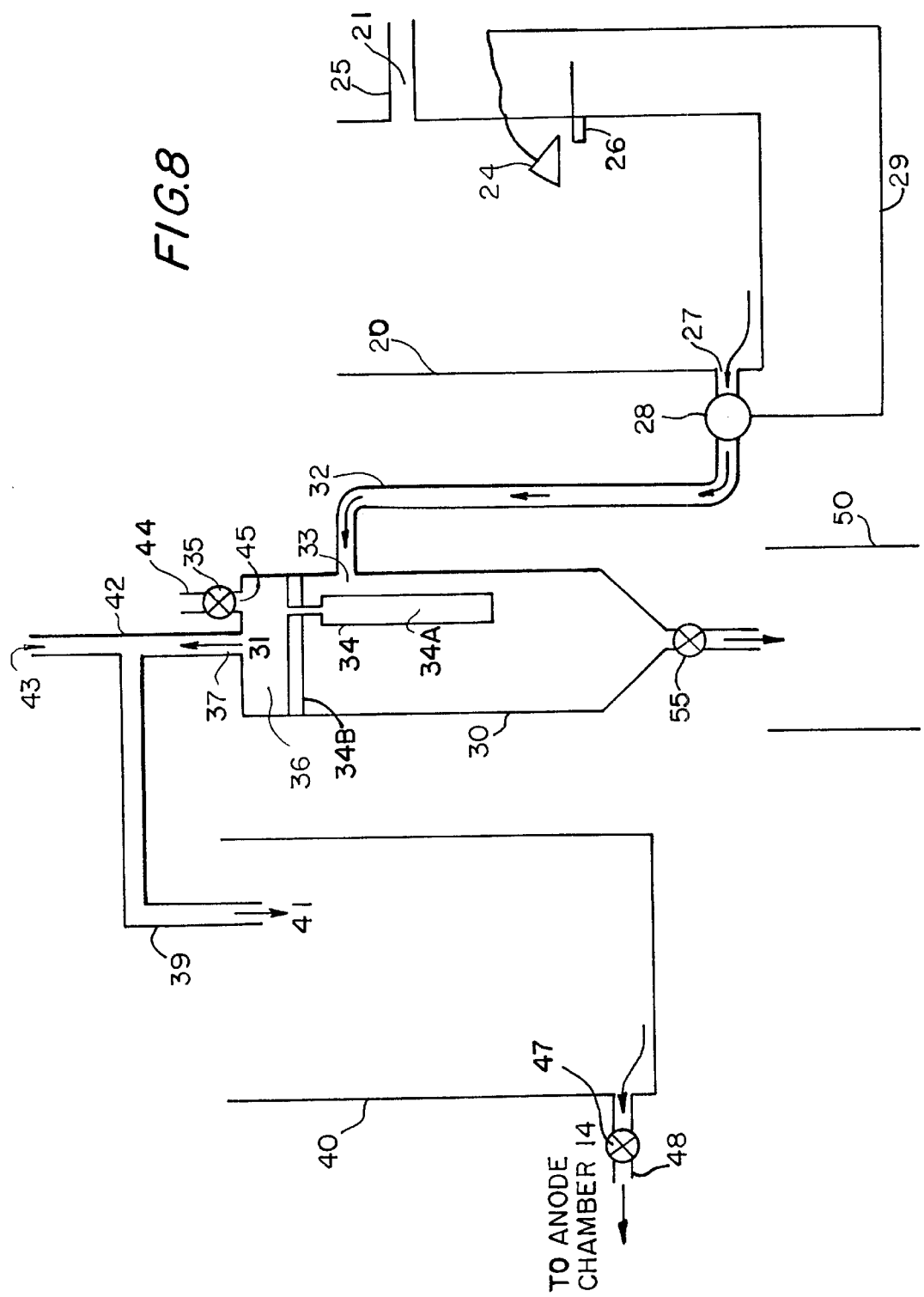
FIG. 8 is a schematic illustration of a preferred embodiment of the filter chamber of the electrolytic treatment unit of the present invention.

As shown in FIG. 8, the spent catholyte holding tank 20 receives the overflow discharge of spent catholyte slurry 21 through input pipe or conduit 25. The level of the spent catholyte slurry 21 in spent catholyte holding tank 20 is maintained by means of a float switch 24 which controls filter feed pump 28 through wiring 29. Float switch 24 controls the operation of filter feed pump 28 so that a functioning level is maintained in spent catholyte holding tank 20, i.e., so that spent catholyte holding tank 20 is not emptied and filter feed pump 28 runs dry. The spent catholyte holding tank 20 includes an outlet 27 near the bottom of spent catholyte holding tank 20 leading to inlet 33 of the filter chamber 30 through pipe or conduit 32. Spent catholyte slurry 21 is driven from spent catholyte holding tank 20 by means of filter feed pump 28 through pipe or conduit 32 into filter chamber 30 via inlet port 33.

As shown in FIG. 8, a pH probe 26 is positioned in the spent catholyte holding tank 20 to measure the pH of the spent catholyte slurry 21. The pH signal from the pH probe 26 is converted to a 4–20 milliamp signal output by an appropriate amplification device (not shown), the amplified signal then being fed to a silicon controlled rectifier (not shown), which automatically throttles the applied electrical potential source so as to maintain the overall pH of the spent catholyte slurry preferably at approximately 9.8. Controlling the amount of electrical current flowing to the electrolytic cell 10 in response to measured changes in the pH of the spent catholyte slurry 21 in holding chamber 20 ensures the adequate production of hydrogen gas and hydroxyl ion at the cathode in accordance with the following the equation:

$$2H_2O+2e^-=H_{2(g)}+2OH^- \qquad (3)$$

The Filtering Apparatus

The filter chamber 30 includes a membrane filtration medium 34 supported by foraminous tubular piping 34A, the assembly mounted into a circular tube sheet 34B. This array divides the filter chamber 30 into a clarified liquid collection zone 36 and a precipitate collection zone 38. An outlet port 37 in the clarified liquid collection zone 36 fluidly connects clarified liquid flow 31 via pipe 39 to the anode feed holding tank 40. The anode feed solution 41 is then conducted to the anode chamber 14 of the electrolytic cell 10 through piping 48 preferably by gravity flow. Flow control valve 47 is utilized to throttle this flow so that the flow rate of the anode feed solution 41 through piping 48 is roughly the same as the flow rate of aqueous feed 11 entering the cathode chamber 12 of the electrolytic cell 10, fed therein through input or header pipe 13.

The filter material of membrane filtration medium 34 in filter chamber 30 is made of porous polytetrafluoroethylene ["PTFE"] material, sold commercially under the trademark of Goretex or Tetratex. Goretex or Tetratex is an expanded PTFE on a polypropylene felt support medium. In a preferred embodiment shown in FIG. 9a, the membrane filtration medium 34 is arranged in cylindrical units grouped together in a bundle, wherein the filter material is in the form of sleeves sealed to foraminous tubular piping 34A at the top and bottom.

An inlet port 45 is fitted atop the clarified liquid collection zone 36 of filter chamber 30 which is fitted with a valve 35 and an inlet pipe 44 which permits the injection of chemical agents, such as mineral acid solutions, meant to dissolve any solids which would blind the membrane filtration medium 34. Such blinding solids are typically composed of calcium carbonate and would be freely soluble in mineral acid. Such unblinding sequences would of necessity be carried out when the filtration system was not operating, i.e., when filter feed pump 28 was unpowered.

Figure 9A:
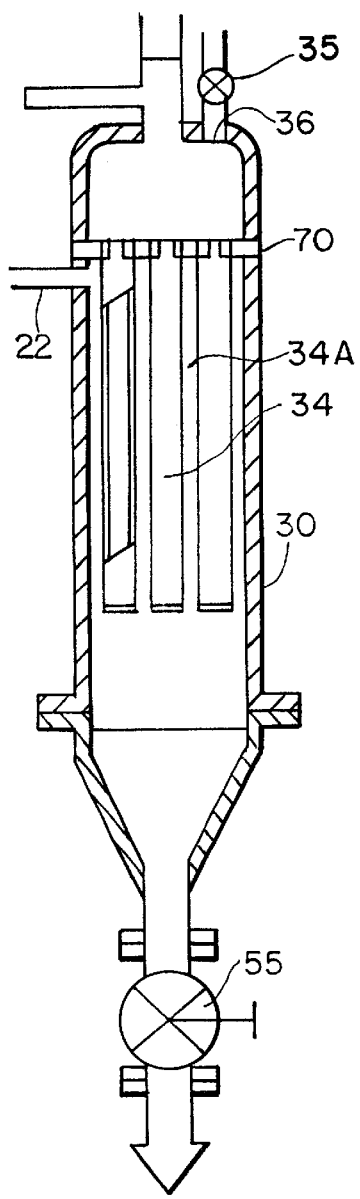
FIG. 9 is a detailed view of the filter chamber of the present invention and an expanded view of a preferred embodiment of the membrane filtration medium of the filter chamber.
Figure 9B:
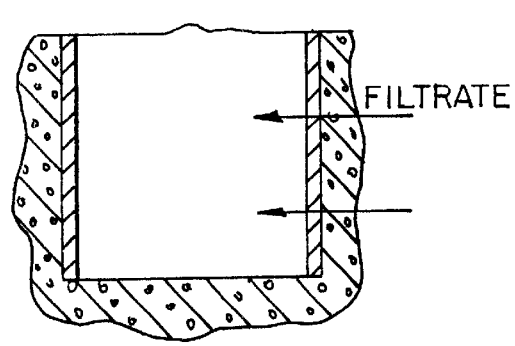

The preferred filter apparatus shown in FIGS. 8 and 9 offers a facile back-pulsing technique which is heretofore unreported. Unblinding filter elements by back-pulsing is usually practiced with a multiplicity of valves and application of back pressures of compressed air. This usually takes several seconds to accomplish but operational problems can develop due to the multiplicity of mechanical steps that must take place simultaneously. The present invention utilizes a simplified back-pulsing technique which requires the use of only one valve and does not require compressed air assist.

The back-pulse is initiated by unpowering filter feed pump 28, which sets up a reverse flow out of filter chamber 30 into spent catholyte holding tank 20 through piping 32. This back flow is instantaneous and small in volume. Since the clarified liquid flow 31 is opened to the atmosphere at vent 43 of tee-pipe connection 42, if dump valve 55 is opened after a 10 millisecond pause in the unpowering of filter feed pump 28, there is an additional backflow from the clarified liquid collection zone 36 which drives clarified liquid flow 31 downward and in a reverse direction through the foraminous tubular piping 34A which supports the membrane filtration medium 34. When constructed so that the membrane filtration medium 34 is approximately 10 percent larger in diameter than the foraminous filter support 34A, the compression that the membrane filtration medium 34 typically undergoes is changed into a momentary expansion during backflow, enabling the blinding solids to be cleared. Essentially, this disparity in diameters causes the membrane filtration medium 34 to pucker inwardly on filtration cycles when filter feed pump 28 is powered on and to expand outwardly on back-pulsing cycles when filter feed pump 28 is turned off and dump valve 55 is opened for approximately one second. The back-pulsing cycle causes any collected precipitate to form into shards and gravitate towards the precipitate collection zone 38. The precipitate then settles to the lowermost portion of precipitate collection zone 38, and is removed through dump valve 55 and into solids holding tank 50, whence it can be dewatered. This back-pulsing technique thus requires only a single valve (dump valve 55) and typically lasts about 2 seconds.

Operation of the Treatment Unit

According to the invention, a contaminated aqueous solution such as sanitary wastewater, drinking water, groundwater, landfill leachate or leachate extracted from irrigated soil, with all its soluble matter and entrained colloidal material, is introduced into the cathode chamber of an electrolytic treatment unit. The electrolytic treatment unit comprises at least one electrolytic cell comprising at least one cathode chamber and at least one adjacent anode chamber separated by a separation membrane of submicron porosity, a spent catholyte holding tank fluidly connected to the cathode chamber(s) and a filter chamber fluidly connected to the spent catholyte holding tank. The filter chamber contains a membrane filtration medium which separates a clarified liquid collection zone from a precipitate collection zone. Pump means are provided for directing the flow of spent catholyte slurry (unfiltered liquid) from the spent catholyte holding tank to the filter chamber and through the membrane filtration medium at a predetermined pressure.

The clarified liquid collection zone in the filter chamber is fluidly connected to an anode feed holding tank. Anolyte from the anode feed holding tank is fed to the anode chamber of the electrolytic cell by the preferred means of gravity flow. Precipitate from the precipitate collection zone of the filter chamber is removed and collected in a solids holding tank, after which it can be further processed to extract heavy metals, if desired.

The aqueous feed solution treated in the cathode chamber (s) passes to the spent catholyte holding tank and then to the filter chamber. The harvesting by filtration is accomplished by passing the spent catholyte slurry from the cathode chamber(s) into the spent catholyte holding tank and applying back-pulse filtration methods.

The spent catholyte slurry, so filtered, is free of its phosphate content, phosphates having being precipitated as calcium and magnesium phosphates and harvested by the filtration process. The spent catholyte, now functionally a dilute ammonia solution with small amounts of soluble organic matter, enters the anode feed holding tank, and then enters the anode chamber(s), preferably by means of gravitational flow from the anode feed holding tank.

Electrolytic Action

In addition to achieving the neutralization of the attraction dynamics between the negatively charged surface of colloidal particles and the dispersion medium, the present invention entails electrical current entering the electrolytic cell which electrolyzes the water molecules, producing hydrogen gas and hydroxyl ions. The process for this cathodic reaction is given as:

$$2H_2O+2e^-=H_{2(g)}+2OH^- \quad (4)$$

Hydroxyl ions are generated in an interfacial zone where the cathode and the solution meet (the cathode-solution interfacial zone). The preferential adsorption of hydroxyl ions to the material surface of all colloidal particles in an aqueous solution ensures that all such colloidal particles, even neutral colloidal particles, will acquire a negative charge. See Alexander and Johnson, *Colloid Science*, 1st Ed., pp. 45–46. the colloidal particles with their material surface negative charge are then drawn to the positively charged surface metal ions of the cathode. Eventually the hydroxyl ions diffuse into the bulk of the catholyte to maintain electrical balance, but freshly emerging hydroxyl ion is always being created as replacement. Though the hydroxyl ions are continuously being diffused into the bulk of the aqueous phase, their concentration in this transient interfacial zone is sufficiently high to convert any phosphate containing ions to triply negative orthophosphate in accordance with the following equation:

$$H_2PO_4^-+2OH^-=PO_4^{3-}+2H_2O \quad (5)$$

The existence of this interfacial zone is indicated by virtue of the fact that all of the phosphate is precipitated as alkaline earth phosphate. In view of the magnitude of the third ionization constant for phosphoric acid and the limiting pH observable in the cathode chamber of 9.7 to 9.8, it has been concluded that the interfacial zone at the cathode surface must have a transient pH of 12 or higher.

pH Control

To precipitate alkaline earth phosphates using the hardness present in water supplies (calcium and magnesium ions), the pH must be temporarily elevated to the point where the orthophosphate ion is generated. This pH is in excess of the limitation on the pH difference that can be maintained in an electrolytic cell with as dilute an electrolyte as aqueous waste. At the onset of electrolysis, the current is carried by the resident electrolyte(s) in the contaminated aqueous solution. As electrolysis proceeds, however, the hydroxyl ion content of the cathode chamber and the hydrogen ion content of the anode chamber starts to build in accordance with the following equation:

$$H_2O=\tfrac{1}{2}O_{2(g)}+2H^++2e^- \quad (6)$$

Soon, the bulk of the current is carried by these two species, and they are annihilated as they cross through the separation membrane. A steady state is reached where the species are annihilated as fast as they are created and a maximum pH difference is observed. Maintaining this maximum pH difference, observed to yield a cathode chamber maximum pH of 9.8 and an anode chamber minimum pH of 3.2, favors this technique of phosphate removal because the transient pH in the interfacial zone rises to levels in excess of 12.0. Accordingly, insofar as phosphate removal, electrical and mechanical means of elevating and maintaining the pH level of the cathode chamber are preferred embodiments of the present invention. Additionally, raising the pH in the interfacial zone to above 12causes the denaturing of microorganisms and any other material of biological origin.

In the present invention, hydrogen ions crossing into a cathode chamber will be neutralized by the excess hydroxyl ion therein contained, the same being true for the hydroxyl ion migrating to an anode chamber.

Uniqueness of the Anode

The structure and operation of the anode enables a complex series of oxidative reactions caused by the intimate contact of the anolyte with the anode surface; furthermore, the anode in the present invention is of a non-sacrificial type. The current density is 40 or preferably above 50 amps/ft$^2$ in order to polarize the anodes so as to minimize oxygen evolution. By restricting the surface area of the anodes in relation to the surface area of the corresponding cathode plates, preferably to a maximum of one per cent of the surface area of the corresponding cathode plates, the evolution of oxygen gas is minimized and the oxidation of chloride ion is maximized.

The Terminal Chemical Phase

The terminal chemical phase in the preferred embodiment enables the oxidation of ammonia to nitrogen gas. The process does not proceed by a single mechanism, and there are other oxidation related processes going on as well. It should be noted that the process does not require the input of any chemical agent; relying solely on the chloride ion content of contaminated aqueous solutions is sufficient. Chloride is a metabolite and is invariably present in cooking residues. Again, no other heretofore known process proceeds on this basis.

The spent catholyte slurry, filtered through the separation membrane, preferably comes into the anode chamber at a pH of 9.7 to 9.8. The anodic action given by Eq. (2) causes a drop in pH to commence. When the anodes are thin and highly polished, an oxygen overvoltage of considerable size develops which preferentially causes the formation of hypochlorite ion, given as:

$$Cl^-+2OH^-=OCl^-+2e^-+H_2O \quad (7)$$

Hypochlorite ion reacts with ammonia to yield chloramine, $NH_2Cl$, according to the following equation:

$$OCl^-+NH_3=OH^-+NH_2Cl \quad (8)$$

Chloramine decomposes according to the following equation:

$$3NH_2Cl = NH_4Cl + N_2 + 2HCl \tag{9}$$

Although the anode is constructed so as to minimize oxygen generation, small but significant amounts of oxygen gas nonetheless evolve in accordance with equation (6). The concomitant lowering of the pH of the anolyte tends to generate the higher chloramines. Specifically, dichloramine is formed at pH 4.5–5.0 and trichloramine is formed at pH levels below 4.5. These higher chloramines yield other pathways to ammonia oxidation. For example, at pH 4.5–5.0, $NHCl_2$ is formed and ammonia oxidation occurs as follows:

$$3NHCl_2 + 7NH_3 = 2N_2 + 6NH_4Cl \tag{10}$$

At pH levels below 4.5, $NCl_3$ is formed and ammonia oxidation occurs as follows:

$$NCl_3 + 4NHl_3 = N_2 + 3NH_4Cl \tag{11}$$

These ammonia destruct processes continue until all the ammonia is exhausted, a point at which the oxidative action will shift to the chlorine species. Chloric acid is the final oxidative state of the element for kinetic reasons. This powerful oxidizing agent will attack any residual organic material and act germicidally, much as chlorine dioxide acts as a water supply purifier. With this type of oxidation, halomethanes are not produced.

EXAMPLES

The following are examples of treatment according to the present invention:

Example 1

An electrolytic cell system comprises a cathode chamber of dimensions 20"×4"×4" with an adjacent anode chamber of the same size, separated by a separation membrane of submicron porosity comprising Goretex filter cloth having a porosity of $0.1\mu$ (microns). The cathode chamber contains one pair of cathode plates of dimensions 20"×2.375"×0.05" comprised of titanium. The cathode plates had been oxidized at 520° C. for approximately 15 minutes in a gas-fired oven. The output from the cathode chamber was connected by a ¼" P.V.C. pipe to a 1.5 liter spent catholyte holding tank, which was in turn connected by similar piping to a single element tubular back-pulse filter 1.5 ft. in length and 1.5 inches in diameter. Filtrate was returned to the anode chamber through ¼" P.V.C. piping. The applied voltage was 16.0 volts, 3.0 watt-hours per gallon treated.

The contaminated aqueous solution to be treated consisted of 0.06 /min of sanitary-industrial wastewater having the following contaminant levels:

| Contaminant | Influent ppm. |
|---|---|
| BOD | 151 |
| TOC | 1108 |
| Phosphate | 16 |
| Ammonia | 22 |
| TDS | 305 |

The effluent from the anode chamber had the following contaminant levels:

| Contaminant | Effluent ppm. |
|---|---|
| BOD | 2 |
| TOC | 43 |
| Phosphate | 0.08 |
| Ammonia | 0.1 |
| TDS | 147 |

The dry, solids precipitate from the solids holding tank comprised a mixture of heavy metals, alkaline earth phosphates, and agglomerated colloidal material.

Example 2

By use of the same equipment, but at an applied voltage of 16.0 volts, 3.5 watt-hours per gallon treated, domestic sanitary wastewater having the following composition was treated:

| Contaminant | Influent ppm. |
|---|---|
| BOD | 224 |
| Phosphate | 7.4 |
| Ammonia | 29 |
| TDS | 105 |

The effluent had the following composition:

| Contaminant | Effluent ppm. |
|---|---|
| BOD | 7 |
| Phosphate | 0 |
| Ammonia | 0.2 |
| TDS | 40.6 |

The dry, solids precipitate from the solids holding tank comprised a mixture of heavy metals, alkaline earth phosphates, and agglomerated colloidal material.

The precipitate produced by the present invention is a dry, ash-like solids residue comprising heavy metals, alkaline earth phosphates and agglomerated colloids and, as such, requires no post-filtration treatment. Additionally, this precipitate, whose mass constitutes but 1–2% of the mass of the concentrated solids byproduct (sludge) resulting from conventional treatment methods, can be reused, i.e., as a filler in various materials used in the construction industry, or the heavy metals contained therein can be readily extracted by chemical means, thereby rendering the resulting solids residue a true "biosolids", entirely suitable for land application. On the other hand, the precipitate produced by Mullerheim's process is a sludge requiring elaborate and costly post-filtration treatment methods such as composting with wood processing and cement production wastes, none of which alters the fact that the end result of Mullerheim's process is still sludge.

Moreover, in addition to avoiding the prohibitive costs associated with bio-oxidative secondary treatment, additive tertiary treatment(s) and sludge disposal, the cost of electric power associated with the practice of the present invention is substantially less than that associated with conventional treatment systems or prior art processes such as Mullerheim's.

In the final analysis, the present invention achieves results that are not achievable by any other known means of treating contaminated aqueous solutions. These results include the removal of all toxic heavy metals, the removal and/or denaturing of all micro-organisms (and any other material of biological origin), significant reduction of inorganic mineral salts, the desolubilization of phosphates, the oxidation of ammonia, and the hydrolysis of urea.

The major advantages of the electrolytic treatment method of the present invention can be summarized as follows:

(1) no chemical additives or biological agents are used;

(2) no sludge is generated as a by-product of treatment, thereby eliminating the problems and costs associated with sludge disposal;

(3) no odor problems or malodorous effects are produced;

(4) no toxic gases are generated;

(5) low detention times are involved;

(6) the effluent produced is entirely free of micro-organisms (and any other material of biological origin) and heavy metals and has low enough concentrations of organic carbon, nitrogen, phosphorous and TSS to allow for its direct discharge to the environment in compliance with current applicable discharge regulations;

(7) the concentrated solids residue produced is a dry, ash-like precipitate comprising heavy metals, alkaline earth phosphates and agglomerated colloids, which requires no post-filtration treatment and can be reused, i.e., as a filler in various materials used in the construction industry, or the heavy metals contained therein can be readily extracted by chemical means, thereby rendering the resulting solids residue a true "biosolids", entirely suitable for land application.

(8) it comprises a single operational unit which has few moving parts, is relatively maintenance free, does not require skilled operator assistance or attendance, and poses no health or safety hazards to workers or the environment;

(9) it involves substantially lower capital and operational costs than conventional treatment systems; and

(10) it requires substantially less land usage than conventional treatment systems.

(11) it can be automated through electronic controls, minimizing operator error.

Accordingly, this invention constitutes a novel and ideal method for treating and purifying contaminated aqueous solutions such as sanitary wastewater, drinking water, groundwater, landfill leachate, and diffusate or leachate extracted from soil.

In the invention, contaminated aqueous solutions are separated into (a) a liquid component comprising an effluent free of micro-organisms and heavy metals and having low enough concentrations of organic carbon, nitrogen, phosphorous and TSS ("Total Suspended Solids") to allow for its direct discharge to the environment, and (b) a concentrated solids component comprising a reusable, dry solids residue containing heavy metals, alkaline earth phosphates and agglomerated colloids. Examples of contaminated aqueous solutions effectively treated by the present invention include sanitary wastewater, drinking water, groundwater, landfill leachate, and diffusate or leachate extracted from soil.

Accordingly, irrigating contaminated soil to produce a diffusate or leachate (contaminated aqueous solution) which can then be treated in accordance with the present invention provides a fast, cost-effective, and highly efficient method for the in situ remediation of soil and one which suffers none of the drawbacks or disadvantages of the heretofore known remediation techniques.

The preceding specific embodiments are illustrative of the practice of the invention. It is to be understood, however, that other expedients known to those skilled in the art or not disclosed herein may be employed without departing from the spirit of the invention or the scope of the appended claims.

Although particular embodiments of the invention have been described, it will be apparent to persons of ordinary skill in the relevant arts that the invention may be practiced by modifications that do not depart from the substance of the invention. Accordingly, the scope of protection of this patent should not be limited to the disclosed embodiments but should be determined from the following description of the invention in terms of claims.

What is claimed is:

1. A method for the electrolytic treatment or remediation of contaminated aqueous solutions contaminated with negatively charged colloidal particles having a surface layer, comprising providing an electrolytic cell comprising a cathode chamber having one or more cathode surfaces with positive charge centers, introducing the contaminated aqueous solution into the cathode chamber, maintaining a potential at the cathode to bring about the electrolysis of water and the production of hydroxyl ions, which renders neutral colloidal particles electronegative in nature and negatively charged colloidal particles more electronegative in nature, maintaining a potential at the cathode to form a cathode-solution interfacial zone adjacent the cathode including both negatively charged colloidal particles and positively charged ions, maintaining a potential at the cathode to collapse the Gouy-Chapman layer about the negatively charged colloidal particles within the cathode-solution interfacial zone adjacent the cathode, wherein the surface layer of the negatively charged colloidal particles is permanently altered within said cathode-solution interfacial zone and the colloidal particles are agglomerated by the action of the positive ions, removing the agglomerated colloidal particles from the contaminated aqueous solution.

2. The method for the electrolytic treatment or remediation of contaminated aqueous solutions of claim 1, wherein the step of removing the agglomerated colloidal particles from the aqueous solution comprises fluidly transporting the liquid from the treatment unit's electrolytic cell to a filter chamber where solids are removed.

3. The method for the electrolytic treatment or remediation of contaminated aqueous solutions of claim 1, where said introducing step further comprises injecting cations into the aqueous solution in order to insure that the concentration of the colloidal particles and ionic matter in the cathode-solution interfacial zone is of sufficient strength to cause the collapse of the Gouy-Chapman layer about the negatively charged colloidal particles within the cathode-solution interfacial zone.

4. The method for the electrolytic treatment or remediation of contaminated aqueous solutions of claim 1, further comprising the step of maintaining the potential at a value sufficient to produce hydroxyl ions in the cathode-solution interfacial zone and raise the pH in the cathode chamber sufficient to convert any present phosphate ions into orthophosphate and precipitate the phosphate as alkaline earth phosphate.

5. The method for the electrolytic treatment or remediation of contaminated aqueous solutions of claim 1, further comprising the step of maintaining the potential at a value sufficient to produce hydroxyl ions in the cathode-solution interfacial zone and raise the pH in the cathode chamber above 12 to convert any present phosphate ions into orthophosphate and precipitate the phosphate as alkaline earth phosphate.

6. The method for the electrolytic treatment or remediation of contaminated aqueous solutions of claim 1, further comprising measuring and controlling the pH level in the cathode chamber.

7. The method for the electrolytic treatment or remediation of contaminated aqueous solutions of claim 1, further comprising adjusting the flow rate of the contaminated aqueous solution into the cathode chamber of the electrolytic cell to maintain the pH level of the cathode chamber in a predetermined range.

8. The method for the electrolytic treatment or remediation of contaminated aqueous solutions of claim 1, further comprising maintaining the potential at the cathode to bring about the hydrolysis of any present urea to ammonia within the cathode chamber, which renders any present nitrogen compounds susceptible to subsequent anodic oxidation.

9. The method for the electrolytic treatment or remediation of contaminated aqueous solutions of claim 1, wherein the cathode surfaces are plates comprising one or more valve metals selected from the group consisting of titanium, yttrium, zirconium, hafnium, niobium, and tantalum.

10. The method for the electrolytic treatment or remediation of contaminated aqueous solutions of claim 1, wherein the cathode surfaces are plates comprising one or more valve metals selected from the group consisting of titanium, yttrium, zirconium, hafnium, niobium, and tantalum, said method further comprising the step of building an irreducible oxide coating on the metal surface of said cathode plate(s).

11. The method for the electrolytic treatment or remediation of contaminated aqueous solutions of claim 1, wherein the cathode surfaces are plates comprising one or more valve metals selected from the group consisting of titanium, yttrium, zirconium, hafnium, niobium, and tantalum, said method further comprising the step of subjecting the cathode plate(s) to air oxidation at an elevated temperature of up to 600° C., to build an irreducible oxide coating on the metal surface of said cathode plate(s).

12. The method for the electrolytic treatment or remediation of contaminated aqueous solutions of claim 1, wherein the cathode surfaces are plates comprising one or more valve metals selected from the group consisting of titanium, yttrium, zirconium, hafnium, niobium, and tantalum, said method further comprising building an irreducible oxide coating on the metal surface of said cathode plate(s) by chemical treatment.

13. The method for the electrolytic treatment or remediation of contaminated aqueous solutions of claim 1, wherein the providing of an electrolytic cell requires said cathodes to form a pair, where each cathode screens the back of other cathode of the pair.

14. The method for the electrolytic treatment or remediation of contaminated aqueous solutions of claim 1, wherein the providing of an electrolytic cell requires said cathodes to form a "V" shaped pair, with each such cathode plate inclined at an angle to the perpendicular or vertical axis of the cell.

15. The method for the electrolytic treatment or remediation of contaminated aqueous solutions of claim 1, wherein the providing of an electrolytic cell requires said cathodes to form a "V" shaped pair, with each such cathode plate inclined at an angle to the perpendicular or vertical axis of the cell in the range of from about 10° to 80° relative to the perpendicular of the cell.

16. The method for the electrolytic treatment or remediation of contaminated aqueous solutions of claim 1, wherein the providing of an electrolytic cell requires said cathodes to form a "V" shaped pair, with each such cathode plate inclined at an angle to the perpendicular or vertical axis of the cell in the range of from about 25° to 65° relative to the perpendicular of the cell.

17. The method for the electrolytic treatment or remediation of contaminated aqueous solutions of claim 1, wherein the providing of an electrolytic cell requires said cathodes to form a "V" shaped pair, with each such cathode plate inclined at an angle to the perpendicular or vertical axis of the cell in the range of from about 40° to 50° relative to the perpendicular of the cell.

18. A method for the electrolytic treatment or remediation of contaminated aqueous solutions contaminated with colloidal particles having a surface layer, comprising providing an electrolytic cell comprising a cathode chamber having cathode surfaces tilted from the vertical with positive charge centers, introducing the contaminated aqueous solution into the cathode chamber, maintaining a potential at the cathode to bring about the electrolysis of water and the production of hydroxyl ions, which renders neutral colloidal particles electronegative in nature and negatively charged colloidal particles more electronegative in nature, maintaining a potential at the cathode to form a cathode-solution interfacial zone adjacent the cathode including both negatively charged colloidal particles and positively charged ions, maintaining a potential at the cathode to collapse the Gouy-Chapman layer about the negatively charged colloidal particles within the cathode-solution interfacial zone adjacent the cathode, wherein the surface layer of the colloidal particles is permanently altered within said cathode-solution interfacial zone and the colloidal particles are agglomerated by the action of the positive ions, further maintaining said potential to induce electrolysis to evolve hydrogen bubbles that move the colloidal particles in a steady state stream within the cathode-solution interfacial zone and allow the agglomerated colloidal particles to separate from said steady state stream, removing the agglomerated colloidal particles from the contaminated aqueous solution.

19. The method for the electrolytic treatment or remediation of contaminated aqueous solutions of claim 18, wherein the step of removing the agglomerated colloidal particles from the aqueous solution comprises fluidly transporting the liquid from the treatment unit's electrolytic cell to a filter chamber where solids are removed.

20. The method for the electrolytic treatment or remediation of contaminated aqueous solutions of claim 18, where said introducing step further comprises injecting cations into the aqueous solution in order to insure that the concentration of the colloidal particles and ionic matter in the cathode-solution interfacial zone is of sufficient strength to cause the collapse of the Gouy-Chapman layer about the negatively charged colloidal particles within the cathode-solution interfacial zone.

21. The method for the electrolytic treatment or remediation of contaminated aqueous solutions of claim 18, further comprising the step of maintaining the potential at a value sufficient to produce hydroxyl ions in the cathode-solution interfacial zone and raise the pH in the cathode chamber sufficient to convert any present phosphate ions into orthophosphate and precipitate the phosphate as alkaline earth phosphate.

22. The method for the electrolytic treatment or remediation of contaminated aqueous solutions of claim 18, further comprising the step of maintaining the potential at a value sufficient to produce hydroxyl ions in the cathode-solution interfacial zone and raise the pH in the cathode chamber above 12 to convert any present phosphate ions into orthophosphate and precipitate the phosphate as alkaline earth phosphate.

23. The method for the electrolytic treatment or remediation of contaminated aqueous solutions of claim 18, further comprising measuring and controlling the pH level in the cathode chamber.

24. The method for the electrolytic treatment or remediation of contaminated aqueous solutions of claim 18, further comprising adjusting the flow rate of the contaminated aqueous solution into the cathode chamber of the electrolytic cell to maintain the pH level of the cathode chamber in a predetermined range.

25. The method for the electrolytic treatment or remediation of contaminated aqueous solutions of claim 18, further comprising maintaining the potential at the cathode to bring about the hydrolysis of any present urea to ammonia within the cathode chamber, which renders any present nitrogen compounds susceptible to subsequent anodic oxidation.

26. The method for the electrolytic treatment or remediation of contaminated aqueous solutions of claim 18, wherein the cathode surfaces are plates comprising one or more valve metals selected from the group consisting of titanium, yttrium, zirconium, hafnium, niobium, and tantalum.

27. The method for the electrolytic treatment or remediation of contaminated aqueous solutions of claim 18, wherein the cathode surfaces are plates comprising one or more valve metals selected from the group consisting of titanium, yttrium, zirconium, hafnium, niobium, and tantalum, said method further comprising the step of building an irreducible oxide coating on the metal surface of said cathode plate(s).

28. The method for the electrolytic treatment or remediation of contaminated aqueous solutions of claim 18, wherein the cathode surfaces are plates comprising one or more valve metals selected from the group consisting of titanium, yttrium, zirconium, hafnium, niobium, and tantalum, said method further comprising the step of is subjecting the cathode plate(s) to air oxidation at an elevated temperature of up to 600° C., to build an irreducible oxide coating on the metal surface of said cathode plate(s).

29. The method for the electrolytic treatment or remediation of contaminated aqueous solutions of claim 18, wherein the cathode surfaces are plates comprising one or more valve metals selected from the group consisting of titanium, yttrium, zirconium, hafnium, niobium, and tantalum, said method further comprising building an irreducible oxide coating on the metal surface of said cathode plate(s) by chemical treatment.

30. The method for the electrolytic treatment or remediation of contaminated aqueous solutions of claim 18, wherein the providing of an electrolytic cell requires said cathodes to form a pair, where each cathode screens the back of other cathode of the pair.

31. The method for the electrolytic treatment or remediation of contaminated aqueous solutions of claim 18, wherein the providing of an electrolytic cell requires said cathodes to form a "V" shaped pair, with each such cathode plate inclined at an angle to the perpendicular or vertical axis of the cell.

32. The method for the electrolytic treatment or remediation of contaminated aqueous solutions of claim 18, wherein the providing of an electrolytic cell requires said cathodes to form a "V" shaped pair, with each such cathode plate inclined at an angle to the perpendicular or vertical axis of the cell in the range of from about 10° to 80° relative to the perpendicular of the cell.

33. The method for the electrolytic treatment or remediation of contaminated aqueous solutions of claim 18, wherein the providing of an electrolytic cell requires said cathodes to form a "V" shaped pair, with each such cathode plate inclined at an angle to the perpendicular or vertical axis of the cell in the range of from about 25° to 65° relative to the perpendicular of the cell.

34. The method for the electrolytic treatment or remediation of contaminated aqueous solutions of claim 18, wherein the providing of an electrolytic cell requires said cathodes to form a "V" shaped pair, with each such cathode plate inclined at an angle to the perpendicular or vertical axis of the cell in the range of from about 40° to 50° relative to the perpendicular of the cell.

35. A method for the electrolytic treatment or remediation of contaminated aqueous solutions contaminated with colloidal particles having a surface layer, comprising providing an electrolytic cell comprising a cathode chamber having one or more cathode surfaces with positive charge centers, and an anode chamber, said cathode chamber and said anode chamber being adjacent and separated by a separation membrane of submicron porosity, introducing the contaminated aqueous solution into the cathode chamber, maintaining a potential at the cathode to bring about the electrolysis of water and the production of hydroxyl ions, which renders neutral colloidal particles electronegative in nature and negatively charged colloidal particles more electronegative in nature, maintaining a potential at the cathode to form a cathode-solution interfacial zone adjacent the cathode including both negatively charged colloidal particles and positively charged ions, maintaining a potential at the cathode to collapse the Gouy-Chapman layer about the negatively charged colloidal particles within the cathode-solution interfacial zone adjacent the cathode, wherein the surface layer of the negatively charged colloidal particles is permanently altered within said cathode-solution interfacial zone and the colloidal particles are agglomerated by the action of the positive ions, further maintaining the potential to bring about oxidation processes in said anode chamber, said separation membrane restricting osmotic reflux (from anode chamber to cathode chamber), removing the agglomerated colloidal particles from the contaminated aqueous solution.

36. The method for the electrolytic treatment or remediation of contaminated aqueous solutions of claim 35, wherein the step of removing the agglomerated colloidal particles from the aqueous solution comprises fluidly transporting the liquid from the treatment unit's electrolytic cell to a filter chamber where solids are removed.

37. The method for the electrolytic treatment or remediation of contaminated aqueous solutions of claim 35, where said introducing step further comprises injecting cations into the aqueous solution in order to insure that the concentration of the colloidal particles and ionic matter in the cathode-solution interfacial zone is of sufficient strength to cause the collapse of the Gouy-Chapman layer about the negatively charged colloidal particles within the cathode-solution interfacial zone.

38. The method for the electrolytic treatment or remediation of contaminated aqueous solutions of claim 35, further comprising the step of maintaining the potential at a value sufficient to produce hydroxyl ions in the cathode-solution interfacial zone and raise the pH in the cathode chamber sufficient to convert any present phosphate ions into orthophosphate and precipitate the phosphate as alkaline earth phosphate.

39. The method for the electrolytic treatment or remediation of contaminated aqueous solutions of claim 35, further comprising the step of maintaining the potential at a value sufficient to produce hydroxyl ions in the cathode-solution interfacial zone and raise the pH in the cathode chamber above 12 to convert any present phosphate ions into orthophosphate and precipitate the phosphate as alkaline earth phosphate.

40. The method for the electrolytic treatment or remediation of contaminated aqueous solutions of claim 35, further comprising measuring and controlling the pH level in the cathode chamber.

41. The method for the electrolytic treatment or remediation of contaminated aqueous solutions of claim 35, further comprising adjusting the flow rate of the contaminated aqueous solution into the cathode chamber of the electrolytic cell to maintain the pH level of the cathode chamber in a predetermined range.

42. The method for the electrolytic treatment or remediation of contaminated aqueous solutions of claim 35, further comprising maintaining the potential at the cathode to bring about the hydrolysis of any present urea to ammonia within the cathode chamber, which renders any present nitrogen compounds susceptible to subsequent anodic oxidation.

43. The method for the electrolytic treatment or remediation of contaminated aqueous solutions of claim 35, wherein the cathode surfaces are plates comprising one or more valve metals selected from the group consisting of titanium, yttrium, zirconium, hafnium, niobium, and tantalum.

44. The method for the electrolytic treatment or remediation of contaminated aqueous solutions of claim 35, wherein the cathode surfaces are plates comprising one or more valve metals selected from the group consisting of titanium, yttrium, zirconium, hafnium, niobium, and tantalum, said method further comprising the step of building an irreducible oxide coating on the metal surface of said cathode plate(s).

45. The method for the electrolytic treatment or remediation of contaminated aqueous solutions of claim 35, wherein the cathode surfaces are plates comprising one or more valve metals selected from the group consisting of titanium, yttrium, zirconium, hafnium, niobium, and tantalum, said method further comprising the step of is subjecting the cathode plate(s) to air oxidation at an elevated temperature of up to 600° C., to build an irreducible oxide coating on the metal surface of said cathode plate(s).

46. The method for the electrolytic treatment or remediation of contaminated aqueous solutions of claim 35, wherein the cathode surfaces are plates comprising one or more valve metals selected from the group consisting of titanium, yttrium, zirconium, hafnium, niobium, and tantalum, said method further comprising building an irreducible oxide coating on the metal surface of said cathode plate(s) by chemical treatment.

47. The method for the electrolytic treatment or remediation of contaminated aqueous solutions of claim 35, wherein the providing of an electrolytic cell requires said cathodes to form a pair, where each cathode screens the back of other cathode of the pair.

48. The method for the electrolytic treatment or remediation of contaminated aqueous solutions of claim 35, wherein the providing of an electrolytic cell requires said cathodes to form a "V" shaped pair, with each such cathode plate inclined at an angle to the perpendicular or vertical axis of the cell.

49. The method for the electrolytic treatment or remediation of contaminated aqueous solutions of claim 35, wherein the providing of an electrolytic cell requires said cathodes to form a "V" shaped pair, with each such cathode plate inclined at an angle to the perpendicular or vertical axis of the cell in the range of from about 10° to 80° relative to the perpendicular of the cell.

50. The method for the electrolytic treatment or remediation of contaminated aqueous solutions of claim 35, wherein the providing of an electrolytic cell requires said cathodes to form a "V" shaped pair, with each such cathode plate inclined at an angle to the perpendicular or vertical axis of the cell in the range of from about 25° to 65° relative to the perpendicular of the cell.

51. The method for the electrolytic treatment or remediation of contaminated aqueous solutions of claim 35, wherein the providing of an electrolytic cell requires said cathodes to form a "V" shaped pair, with each such cathode plate inclined at an angle to the perpendicular or vertical axis of the cell in the range of from about 40° to 50° relative to the perpendicular of the cell.

52. The method for the electrolytic treatment or remediation of contaminated aqueous solutions of claim 35, wherein the providing step requires providing a separation membrane whose structure allows conductivity driven ionic transfers while containing the colloidal particles within the cathode chamber.

53. The method for the electrolytic treatment or remediation of contaminated aqueous solutions of claim 35, further comprising the step of oxidizing ammonia to nitrogen gas in the cathode chamber and producing chloric acid in the anode chamber to oxidize residual soluble organic material.

54. The method for the electrolytic treatment or remediation of contaminated aqueous solutions of claim 35, further comprising the step of hydrolyzing urea to ammonia in the cathode chamber and oxidizing the ammonia to nitrogen gas in the anode chamber.

55. The method for the electrolytic treatment or remediation of contaminated aqueous solutions of claim 35, further comprising the step of removing substantially all carbonaceous organic matter prior to anodic oxidation.

56. The method for the electrolytic treatment or remediation of contaminated aqueous solutions of claim 35, wherein said anode chamber comprises anodes having a smooth surface area that is less that one percent (1%) of the surface area of the cathode plates.

57. The method for the electrolytic treatment or remediation of contaminated aqueous solutions of claim 35, wherein said anode chamber comprises anodes having a surface area which is a fraction of the surface area of the cathode plates to assure that the current density at the anodes is at least forty (40) amps/ft.$^2$.

58. The method for the electrolytic treatment or remediation of contaminated aqueous solutions of claim 35, further comprising the step of dropping the pH in th anode chamber by electrolyzing the water and the chloride ions present in the aqueous solution, thereby causing the formation of hypochorite ion and higher chloramines, whereby ammonia is oxidized and chloric acid is formed, which attacks any residual organic material.

59. A method for the electrolytic treatment or remediation of contaminated aqueous solutions employing an electrolytic treatment or remediation unit comprising
  introducing the contaminated aqueous solution into the cathode chamber of an electrolytic cell having
    a cathode chamber having cathode surfaces tilted from the vertical with positive charge centers and
    an anode chamber having an anode separated from the cathode chamber by
    a separation membrane of sub-micron porosity,
  applying a direct electrical potential across the cathode and anode of the electrolytic cell,
  flowing catholyte from the cathode chamber to a spent catholyte holding tank,
  flowing output from the spent catholyte holding tank to a filter chamber fluidly connected thereto, and
  flowing output from the filter chamber to an anode feed holding tank fluidly connected thereto.

60. The method for the electrolytic treatment or remediation of contaminated aqueous solutions of claim 59, further comprising the step of removing agglomerated colloidal particles from the aqueous solution by fluidly transporting the liquid from the electrolytic cell to a filter chamber where solids are removed.

61. The method for the electrolytic treatment or remediation of contaminated aqueous solutions of claim 59, where said introducing step further comprises injecting cations into the aqueous solution in order to insure that the concentration of colloidal particles and ionic matter in the cathode-solution interfacial zone is of sufficient strength to cause the collapse of the Gouy-Chapman layer about the colloidal particles within a cathode-solution interfacial zone.

62. The method for the electrolytic treatment or remediation of contaminated aqueous solutions of claim 59, further comprising the step of maintaining the potential at a value sufficient to produce hydroxyl ions in an interfacial zone and raise the pH in the cathode chamber sufficient to convert any present phosphate ions into orthophosphate and precipitate the phosphate as alkaline earth phosphate.

63. The method for the electrolytic treatment or remediation of contaminated aqueous solutions of claim 59, further comprising the step of maintaining the potential at a value sufficient to produce hydroxyl ions in an interfacial zone and raise the pH in the cathode chamber above 12 to convert any present phosphate ions into orthophosphate and precipitate the phosphate as alkaline earth phosphate.

64. The method for the electrolytic treatment or remediation of contaminated aqueous solutions of claim 59, further comprising measuring and controlling the pH level in the cathode chamber.

65. The method for the electrolytic treatment or remediation of contaminated aqueous solutions of claim 59, further comprising adjusting the flow rate of the contaminated aqueous solution into the cathode chamber of the electrolytic cell to maintain the pH level of the cathode chamber in a predetermined range.

66. The method for the electrolytic treatment or remediation of contaminated aqueous solutions of claim 59, further comprising maintaining the potential at the cathode to bring about the hydrolysis of any present urea to ammonia within the cathode chamber, which renders any present nitrogen compounds susceptible to subsequent anodic oxidation.

67. The method for the electrolytic treatment or remediation of contaminated aqueous solutions of claim 59, wherein the cathode surfaces are plates comprising one or more valve metals selected from the group consisting of titanium, yttrium, zirconium, hafnium, niobium, and tantalum.

68. The method for the electrolytic treatment or remediation of contaminated aqueous solutions of claim 59, wherein the cathode surfaces are plates comprising one or more valve metals selected from the group consisting of titanium, yttrium, zirconium, hafnium, niobium, and tantalum, said method further comprising the step of building an irreducible oxide coating on the metal surface of said cathode plate(s).

69. The method for the electrolytic treatment or remediation of contaminated aqueous solutions of claim 59, wherein the cathode surfaces are plates comprising one or more valve metals selected from the group consisting of titanium, yttrium, zirconium, hafnium, niobium, and tantalum, said method further comprising the step of is subjecting the cathode plate(s) to air oxidation at an elevated temperature of up to 600° C., to build an irreducible oxide coating on the metal surface of said cathode plate(s).

70. The method for the electrolytic treatment or remediation of contaminated aqueous solutions of claim 59, wherein the cathode surfaces are plates comprising one or more valve metals selected from the group consisting of titanium, yttrium, zirconium, hafnium, niobium, and tantalum, said method further comprising building an irreducible oxide coating on the metal surface of said cathode plate(s) by chemical treatment.

71. The method for the electrolytic treatment or remediation of contaminated aqueous solutions of claim 59, wherein the electrolytic cell requires said cathodes to form a pair, where each cathode screens the back of other cathode of the pair.

72. The method for the electrolytic treatment or remediation of contaminated aqueous solutions of claim 59, wherein the electrolytic cell requires said cathodes to form a "V" shaped pair, with each such cathode plate inclined at an angle to the perpendicular or vertical axis of the cell.

73. The method for the electrolytic treatment or remediation of contaminated aqueous solutions of claim 59, wherein the electrolytic cell requires said cathodes to form a "V" shaped pair, with each such cathode plate inclined at an angle to the perpendicular or vertical axis of the cell in the range of from about 10° to 80° relative to the perpendicular of the cell.

74. The method for the electrolytic treatment or remediation of contaminated aqueous solutions of claim 59, wherein the electrolytic cell requires said cathodes to form a "V" shaped pair, with each such cathode plate inclined at an angle to the perpendicular or vertical axis of the cell in the range of from about 25° to 65° relative to the perpendicular of the cell.

75. The method for the electrolytic treatment or remediation of contaminated aqueous solutions of claim 59, wherein the electrolytic cell requires said cathodes to form a "V" shaped pair, with each such cathode plate inclined at an angle to the perpendicular or vertical axis of the cell in the range of from about 40° to 50° relative to the perpendicular of the cell.

76. The method for the electrolytic treatment or remediation of contaminated aqueous solutions of claim 59, wherein said separation membrane allows conductivity driven ionic transfers while containing the colloidal particles within the cathode chamber.

77. The method for the electrolytic treatment or remediation of contaminated aqueous solutions of claim 59, further comprising the step of oxidizing ammonia to nitrogen gas in the cathode chamber and producing chloric acid in the anode chamber to oxidize residual soluble organic material.

78. The method for the electrolytic treatment or remediation of contaminated aqueous solutions of claim 59, further comprising the step of hydrolyzing urea to ammonia in the cathode chamber and oxidizing the ammonia to nitrogen gas in the anode chamber.

79. The method for the electrolytic treatment or remediation of contaminated aqueous solutions of claim 59, wherein anodic oxidation occurs, further comprising the step of removing substantially all carbonaceous organic matter prior to anodic oxidation.

80. The method for the electrolytic treatment or remediation of contaminated aqueous solutions of claim 59, wherein said anode chamber comprises anodes having a smooth surface area that is less that one percent (1%) of the surface area of the cathode plates.

81. The method for the electrolytic treatment or remediation of contaminated aqueous solutions of claim 59, wherein said anode chamber comprises anodes having a surface area which is a fraction of the surface area of the cathode plates to assure that the current density at the anodes is at least forty (40) amps/ft.$^2$.

82. The method for the electrolytic treatment or remediation of contaminated aqueous solutions of claim 59, further comprising the step of dropping the pH in the anode chamber by filtering the catholyte and introducing it into the anode chamber, thereby causing the formation of hypochlorite ion and higher chloramines, whereby ammonia is oxidized and chloric acid is formed, which attacks any residual organic material.

83. The method for the electrolytic treatment or remediation of contaminated aqueous solutions of claim 59, further comprising separating by a membrane filtration medium the fluid in said filter chamber into a clarified liquid collected in a clarified liquid collection zone and a precipitate collected in a precipitate collection zone.

84. The method for the electrolytic treatment or remediation of contaminated aqueous solutions of claim 59, further comprising separating by a membrane filtration medium the fluid in said filter chamber into a clarified liquid collected in a clarified liquid collection zone and a precipitate collected in a precipitate collection zone and collecting the precipitate in a solids holding tank.

85. The method for the electrolytic treatment or remediation of contaminated aqueous solutions of claim 59, further comprising separating by a membrane filtration medium the fluid in said filter chamber into a clarified liquid collected in a clarified liquid collection zone and a precipitate collected in a precipitate collection zone, collecting the precipitate in a solids holding tank, and processing the precipitate to extract heavy metals.

86. The method for the electrolytic treatment or remediation of contaminated aqueous solutions of claim 59, further comprising separating by a membrane filtration medium the fluid in said filter chamber into a clarified liquid collected in a clarified liquid collection zone and a precipitate collected in a precipitate collection zone and back-pulsing liquid through the membrane filtration medium to unbind the filter material using a system employing no compressed air assist.

87. The method for the electrolytic treatment or remediation of contaminated aqueous solutions of claim 59, further comprising measuring the pH of the spent catholyte slurry in the spent catholyte holding tank, and communicating the pH measurements thus obtained for controlling the amount of electrical potential being applied to the electrolytic cell.

88. An electrolytic treatment or remediation unit comprising
an electrolytic cell having
a cathode chamber having cathode surfaces tilted from the vertical with positive charge centers and
an anode chamber having an anode separated from the cathode chamber by
a separation membrane of sub-micron porosity,
an electrical circuit for providing an electrical current through the electrolytic cell by applying a direct electrical potential across the cathode and anode of the electrolytic cell.

89. An electrolytic treatment or remediation unit comprising an electrolytic cell having
a cathode chamber having cathode surfaces tilted from the vertical with positive charge centers and
an anode chamber having an anode separated from the cathode chamber by
a separation membrane of sub-micron porosity,
an electrical circuit for providing an electrical current through the electrolytic cell by applying a direct electrical potential across the cathode and anode of the electrolytic cell,
a spent catholyte holding tank fluidly connected to receive catholyte from the cathode chamber,
a filter chamber fluidly connected downstream from the spent catholyte holding tank,
an anode feed holding tank fluidly connected downstream from the filter chamber and
a flow control valve to stabilize the flow from the anode feed holding tank to the anode chamber.

* * * * *